United States Patent
Morita et al.

(10) Patent No.: US 6,689,311 B2
(45) Date of Patent: Feb. 10, 2004

(54) METHOD AND APPARATUS FOR MANUFACTURING SINTER, METHOD FOR MEASURING CONCENTRATION OF PLASTICIZER, EVALUATION METHOD, AND EVALUATION APPARATUS

(75) Inventors: Kiyoyuki Morita, Yawata (JP); Hideyuki Okinaka, Toyonaka (JP); Gen Itakura, Eniwa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 61 days.

(21) Appl. No.: 09/986,744

(22) Filed: Nov. 9, 2001

(65) Prior Publication Data

US 2002/0057980 A1 May 16, 2002

(30) Foreign Application Priority Data

Nov. 13, 2000 (JP) ........................................ 2000-345049

(51) Int. Cl.⁷ .................................................. B22F 3/10
(52) U.S. Cl. ................................ 419/8; 419/36; 419/37
(58) Field of Search ................................ 419/36, 37, 8

(56) References Cited

U.S. PATENT DOCUMENTS

| | | | | |
|---|---|---|---|---|
| 4,917,859 A | * | 4/1990 | Hamo | .......................... 419/36 |
| 5,021,213 A | * | 6/1991 | Nishio et al. | ................... 419/36 |
| 5,935,514 A | * | 8/1999 | Ford, Jr. et al. | ............. 264/630 |
| 5,985,208 A | * | 11/1999 | Zedalis et al. | ................. 419/36 |
| 6,080,345 A | * | 6/2000 | Chalasani et al. | ........... 264/109 |

FOREIGN PATENT DOCUMENTS

| | | | | |
|---|---|---|---|---|
| JP | 63-064977 | | 3/1988 | |
| JP | 401215907 A | * | 8/1989 | ............. B22F/3/02 |

* cited by examiner

Primary Examiner—Daniel J. Jenkins
(74) Attorney, Agent, or Firm—McDermott, Will & Emery

(57) ABSTRACT

A method for selectively and rapidly extracting/removing a plasticizer from a compact such as a green laminate that is produced at a certain point in the process of manufacturing a multilayer ceramic capacitor. Carbon dioxide is introduced into a pressure chamber in which the green laminate has been placed, and the temperature and the pressure of the pressure chamber are set to 40° C. and 10 MPa, respectively, so that the pressure chamber is filled with a supercritical carbon dioxide. The plasticizer is extracted/removed from the green laminate by using the supercritical carbon dioxide. Then, a de-binder step and a baking step are performed in an ordinary manner. By performing the de-plasticizer process of selectively extracting/removing the plasticizer before the de-binder step, it is possible to suppress the formation of a graphite-like substance even if the temperature is increased rapidly in the subsequent de-binder step and the baking step. Therefore, the manufacturing yield or the performance of the product from will not be reduced.

18 Claims, 15 Drawing Sheets

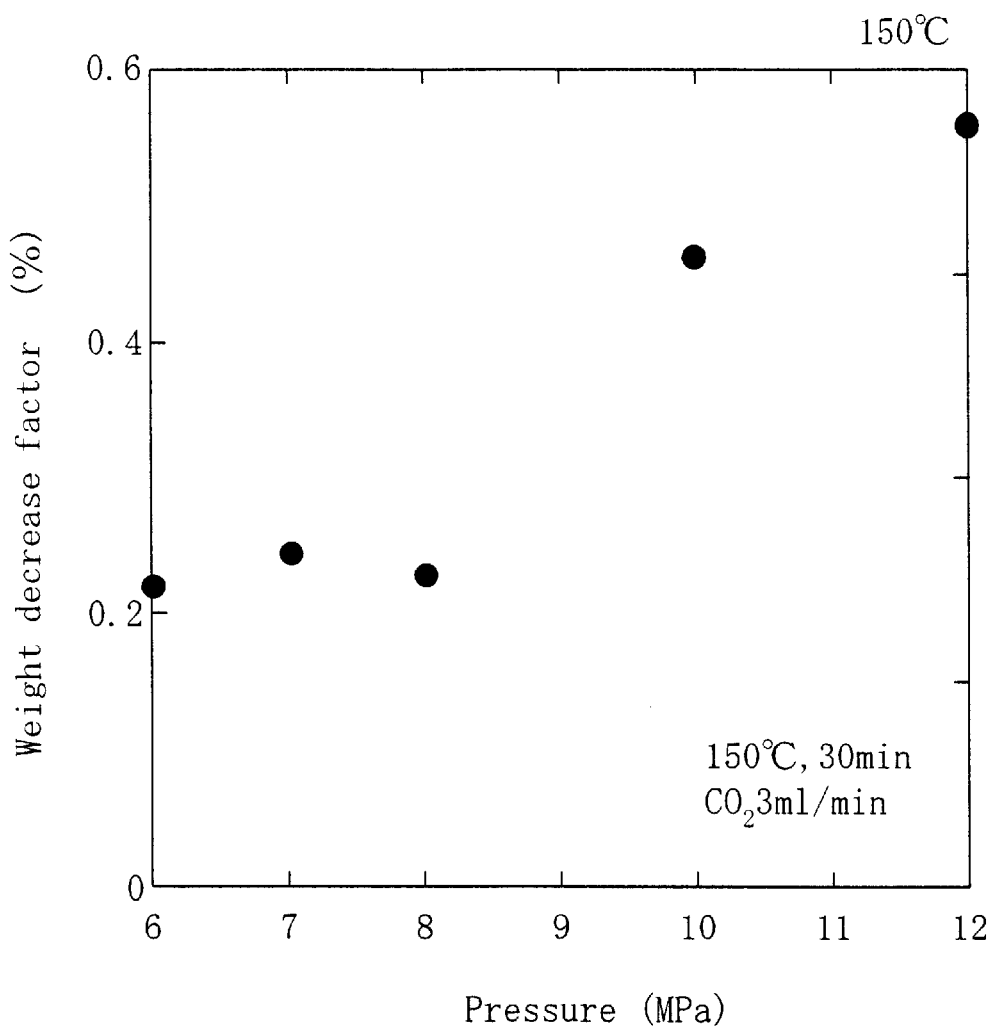

METHOD AND APPARATUS FOR MANUFACTURING SINTER, METHOD FOR MEASURING CONCENTRATION OF PLASTICIZER, EVALUATION METHOD, AND EVALUATION APPARATUS

BACKGROUND OF THE INVENTION

The present invention relates to a method and apparatus for manufacturing a sinter by sintering a laminate including a layer containing a ceramic powder or a metal powder and an organic layer such as a binder or a plasticizer, and other techniques related thereto.

In recent years, a multilayer ceramic component, including ceramic layers and conductive layers layered on one another, has been downsized and the performance thereof has been improved. A multilayer ceramic component will now be described with respect to a multilayer ceramic capacitor, which is one type of a multilayer ceramic component. For a multilayer ceramic capacitor, which has been used as a main component of a mobile station (hand held terminal) in a mobile communication system, such as a portable telephone, there is a demand for reducing the size thereof while increasing the capacity thereof, i.e., improving two contradicting characteristics thereof. To meet such a demand, attempts have been made in the art to reduce the thickness of a dielectric layer, increasing the number of layers, and increasing the dielectric constant thereof by developing a new material therefor. However, since there is a limit on the reduction of the thickness of a dielectric layer or the increase in the dielectric constant thereof by developing a new material therefor, the area of a multilayer ceramic capacitor has been increasing each year in order to increase the capacity thereof.

A multilayer ceramic capacitor is typically manufactured as follows. First, a dielectric material powder, a binder, a plasticizer, a dispersant, a solvent, etc., are mixed together and stirred to produce a dielectric slurry having an appropriate viscosity. Typically, barium titanate is used for the dielectric material, an acrylic resin for the binder, an ester-based plasticizer such as dibutyl phthalate for the plasticizer, an anionic surfactant such as carboxylate for the dispersant, and an ester such as butyl acetate, an alcohol, an ether or a hydrocarbon for the solvent. On the other hand, an internal electrode paste is produced by mixing a metal powder such as nickel and an organic substance together into a paste.

Then, a dielectric film is produced by directly screen-printing the dielectric slurry using a print laminator, or the like. Then, an internal electrode pattern is produced similarly by directly screen-printing the internal electrode paste using a different screen. The screen printing process for a dielectric film and an internal electrode pattern as described above is repeated for a desired number of times so as to produce a green sheet including electrodes and dielectric films alternating with each other. After the lamination step, the green sheet is cut into pieces according to the size of each printed chip, thereby obtaining a green laminate. Then, the green laminate is placed into a case in preparation for baking, and the process proceeds to a degreasing step and a baking step. The degreasing step refers to a step of removing organic substances contained in the green laminate such as a binder, a plasticizer, a solvent, etc. The baking step refers to a step of sintering through a reaction between ceramic grains. After the completion of the baking step, an external electrode, etc., are formed, after optional steps such as polishing the side surface, etc., in order to connect the internal electrodes to each other and at the same time to extract the terminals to the outside. Depending on the structure of the ceramic laminate component, a base electrode, an intermediate electrode, etc., may be formed.

The degreasing step takes a large portion of the total amount of time for the manufacture of the multilayer ceramic capacitor. As described above, in the degreasing step, organic substances such as a binder and a plasticizer, which are used for maintaining the shape of the green sheet, are decomposed and removed. Normally, the degreasing step is performed in the air. In order to increase the manufacturing efficiency, it is preferred to perform the degreasing step while rapidly increasing and decreasing the temperature of the furnace. However, if the furnace is rapidly heated, the organic substances such as a binder and a plasticizer are rapidly evaporated and decomposed, which may induce structural defects such as delamination or a crack. Such defects significantly influence the quality of the product. In view of this, the green laminate is presently degreased by slowly increasing and decreasing the temperature through a temperature range of 150 to 300° C. over a time period of 20 hours to several days. In recent years, the amount of time for the degreasing step has been increasing due to an increase in the size (particularly, the area) of a chip along with an increase in the capacitance of a capacitor. Moreover, while degreasing is done in order to remove organic substances from a green laminate, as described above, the green laminate contains a mixture of various organic substances, including a binder, a plasticizer, a dispersant, a solvent, etc., and these organic substances have different evaporation temperatures and different decomposition temperatures. Therefore, the degreasing step requires a very precise temperature control and process control.

As described above, the degreasing step requires a very precise temperature control and process control, and the amount of time for the degreasing step has been increasing due to an increase in the size and capacitance of a capacitor. With the conventional thermal decomposition/removal method performed in the air, it is very difficult to shorten the process time by speeding the degreasing step. On the other hand, many problems occur if the baking step is performed without sufficiently removing the organic substances such as a binder. Particularly, if there remains an amount of plasticizer as a result of failing to sufficiently remove it during the degreasing step, benzene rings in the plasticizer react in the baking step to produce a graphite-like substance, and the graphite-like substance causes various defects in the multilayer ceramic component. First, the graphite-like to substance has an expansion coefficient different from those of ceramics, an internal electrode material, etc., whereby it is likely to induce structural defects such as delamination or a crack as described above. Moreover, the graphite-like substance has a π electron and thus a high conductivity, whereby it may cause a leak current between the internal electrodes. As described above, if the plasticizer is not removed in the degreasing step, the manufacturing yield decreases, and the performance of the multilayer ceramic component also decreases. Therefore, it has been unavoidable to perform a time-consuming degreasing step in the prior art.

Moreover, with the conventional thermal decomposition/removal method performed in the air, an organic substance may be present in a gas that is discharged during the de-binder step, thereby also presenting an environmental problem. Therefore, it has been necessary to completely decompose and incinerate the organic substance or remove the organic substance by adsorption, etc., thus presenting a cost problem.

Methods for degreasing ceramics by using a supercritical fluid have been proposed in the art (e.g., Chemical Engineering, 1986 May issue, pp. 46–49, Shozaburo Saito, "Chourinkairyutai No Kagaku to Gijutsu (Science And Technology Of Supercritical Fluid)", Sankyo Business). Generally, a supercritical fluid has a high dissolving ability. The degreasing of a ceramics compact can be done in a very short time by removing a binder using a supercritical fluid. With this method, however, the function of maintaining the shape of a green laminate deteriorates when removing a plasticizer and a binder from the green laminate, thereby deteriorating the precision in the shape of the product.

SUMMARY OF THE INVENTION

The present invention is based on a discovery that the total amount of time for the degreasing step can be reduced by quickly removing only a plasticizer among various organic substances that are used in a green sheet, and an object of the present invention is to provide a method and apparatus for manufacturing a multilayer ceramic structure in which the manufacturing efficiency is improved while maintaining the shape of the green laminate at a high precision, by utilizing the characteristics of a supercritical fluid.

A first method for manufacturing a sinter of the present invention includes the steps of: (a) layering an internal electrode layer containing at least a conductive material powder and a dielectric layer containing a ceramic material powder, a binder and a plasticizer on each other, so as to produce a green laminate; (b) contacting the green laminate with a supercritical or subcritical fluid so as to extract/remove the plasticizer in the green laminate; (c) after the step (b), decomposing and removing the binder in the green laminate; and (d) after the step (c), sintering the green laminate.

With the conventional degreasing step in which the plasticizer and the binder are removed from the green laminate through thermal decomposition, structural defects occur in the green laminate if the temperature is increased rapidly, and the process time becomes undesirably long if the temperature is increased gradually so as to prevent the occurrence of the structural defects. In contrast, with the method of the present invention, the plasticizer is selectively extracted/removed from the green laminate by using the supercritical or subcritical fluid before the de-binder step, thereby suppressing the formation of a graphite-like substance even if the temperature is increased rapidly in the subsequent de-binder step. Therefore, it is possible to increase the manufacturing efficiency without reducing the manufacturing yield or the performance of the product due to the occurrence of structural defects in the green laminate and thus in the sinter.

In the step (a), at least one resin selected from a butyral resin, an acrylic resin, a polypropylene and a polyethylene may be used as the binder.

In the step (a), at least one substance selected from an ester, stearic acid, stearyl alcohol and a paraffin may be used as the plasticizer. Particularly, it is preferred to use a phthalate ester.

Preferably, in the step (a), a paraffin that is present in a form of a solid during the step (b) is used as the plasticizer.

Preferably, in the step (b), at least one substance selected from carbon dioxide, a hydrocarbon and a polyhalogenated hydrocarbon is used as the supercritical or subcritical fluid.

Preferably, in the step (b), carbon dioxide is used as the supercritical or subcritical fluid, and the temperature of carbon dioxide is maintained in a range from room temperature to 50° C., or in a range from 140° C. to a temperature used in the step (c).

In the step (b), at least one substance selected from an alcohol, a ketone and a hydrocarbon may be mixed in the supercritical or subcritical fluid as an entrainer (extraction assistant).

In the step (b), a pressure of the fluid containing the plasticizer that has been extracted/removed from the green laminate may be reduced so as to turn the fluid into a gaseous state, thereby separating the fluid and the plasticizer from each other to collect the plasticizer. In this way, it is possible to save the time and cost for disposing of the plasticizer.

In the step (a), at least one metal selected from Pt, Pd and Ni may be used as the conductive material powder.

In the step (b), a pressure of the supercritical or subcritical fluid may be changed with time. In this way, it is possible to further improve the plasticizer extraction/removal efficiency.

In the step (b), an ultrasonic vibration may be applied to the fluid. Also in this way, it is possible to further improve the plasticizer extraction/removal efficiency.

The method may further include the step of subjecting the green laminate to a heat treatment at 250° C. or more in a vacuum or a gas, between the step (a) and the step (b). In this way, it is possible to more effectively suppress the occurrence of structural defects in the green laminate and thus in the sinter.

In the step (b), the green laminate may be pressurized by using a pressurization medium, and then the pressurization medium may be substituted by the supercritical or subcritical fluid. In this way, it is possible to more effectively suppress the occurrence of structural defects in the green laminate and thus in the sinter.

Preferably, an inert gas is used as the pressurization medium, and at least one substance selected from carbon dioxide, a hydrocarbon and a polyhalogenated hydrocarbon is used as the supercritical or subcritical fluid.

In the step (b), the fluid may be turned into a supercritical or subcritical state by rapidly pressurizing the fluid at a rate of 1 MPa/min or more. In this way, it is possible to more effectively suppress the occurrence of structural defects in the green laminate and thus in the sinter.

Preferably, the method further includes the step of evaluating a concentration distribution of the plasticizer in the green laminate by using a microscopic laser Raman spectroscopy method, at any point after the step (b) and before the step (d).

More preferably, a relative concentration distribution is obtained by calculating a relative intensity by normalizing an intensity of a plasticizer-induced absorption band peak of the Raman spectrum with respect to an intensity of a ceramic-induced absorption band peak.

A second method for manufacturing a sinter of the present invention includes the steps of: (a) compacting a mixture of an inorganic substance and an organic substance so as to obtain a compact; (b) contacting the compact with a supercritical or subcritical fluid so as to extract/remove the organic substance in the compact; and (c) after the step (b), sintering the compact so as to obtain a sinter, wherein a material that is in a liquid state in the step (b) and in a solid state in the step (c) is used as the organic substance.

With this method, the organic substance has a fluidity in the step (a), whereby the compaction can be performed smoothly. On the other hand, the organic substance is a solid in the step (b), whereby the organic substance does not undergo a volumetric expansion. Therefore, it is possible to suppress the occurrence of structural defects in the compact upon completion of the step (b) and thus in the sinter.

A third method for manufacturing a sinter of the present invention includes the steps of: (a) compacting a mixture of an inorganic substance and an organic substance so as to obtain a compact; (b) after the step (a), subjecting the compact to a heat treatment in a vacuum or a gas so as to partially remove the organic substance; (c) after the step (b), contacting the compact with a supercritical or subcritical fluid so as to extract/remove the organic substance in the compact; and (d) after the step (c), sintering the compact so as to obtain a sinter.

With this method, the organic substance is partially removed in the step (b), thereby producing gaps in the compact. As a result, even if the fluid in the organic substance expands in the step (c), the expansion is buffered by the gaps, thereby suppressing the occurrence of structural defects in the compact and thus in the sinter.

A fourth method for manufacturing a sinter of the present invention includes the steps of: (a) compacting a mixture of an inorganic substance and an organic substance so as to obtain a compact; (b) after the step (a), pressurizing the compact by using a pressurization medium, and then substituting the pressurization medium by a supercritical or subcritical fluid so as to contact the compact with the supercritical or subcritical fluid, thereby extracting/removing the organic substance in the compact; and (c) after the step (b), sintering the compact so as to obtain a sinter.

Since the compact is already pressurized in the step (b), the fluid in the organic substance of the compact does not undergo a volumetric expansion, thereby suppressing the occurrence of structural defects in the compact and thus in the sinter.

Preferably, an inert gas is used as the pressurization medium, and at least one substance selected from carbon dioxide, a hydrocarbon and a polyhalogenated hydrocarbon is used as the supercritical or subcritical fluid.

A fifth method for manufacturing a sinter of the present invention includes the steps of: (a) compacting a mixture of an inorganic substance and an organic substance so as to obtain a compact; (b) contacting the compact with a supercritical or subcritical fluid so as to extract/remove the organic substance in the compact; and (c) after the step (b), sintering the compact so as to obtain a sinter, wherein in the step (b), the fluid is turned into a supercritical or subcritical state by rapidly pressurizing the fluid at a rate of 1 MPa/min or more.

With this method, a high pressure state is reached while the dissolution of the fluid in the organic substance is insufficient, and thus the organic substance undergoes little volumetric expansion, thereby suppressing the occurrence of structural defects in the compact and thus in the sinter.

A sixth method for manufacturing a sinter of the present invention includes the steps of: (a) compacting a mixture containing at least a conductive material powder or a ceramic material powder and an organic substance so as to obtain a porous material; (b) contacting the porous material with a supercritical or subcritical fluid so as to extract/remove the organic substance in the porous material; and (c) after the step (b), sintering the porous material at a high temperature so as to obtain a porous sinter.

Also with this method, it is possible to increase the manufacturing efficiency without deteriorating the quality due to the occurrence of structural defects in the compact and thus in the sinter.

Preferably, in the step (a), at least one substance selected from camphor, naphthalene and a paraffin is used as the organic substance.

An apparatus for manufacturing a sinter of the present invention includes: a pressure chamber capable of maintaining a fluid in a supercritical or subcritical state; a supply device for supplying the fluid; a temperature control device for controlling a temperature of the pressure chamber; a pressure control device for controlling a pressure of the pressure chamber; a depressurizing device for depressurizing the fluid discharged from the pressure chamber; and a plasticizer collecting device for turning the plasticizer into a liquid or a solid so as to separate and collect the plasticizer from the fluid in the depressurizing device.

In this way, it is possible to carry out the methods for manufacturing a laminate described above while saving the time and cost for disposing of the plasticizer.

The apparatus may further include a pressurizing device for pressurizing again the fluid that has been depressurized by the depressurizing device so as to turn the fluid into a supercritical or subcritical state. In this way, it is possible to save the time and cost for discharging the fluid into the atmospheric air.

The apparatus may further include a spectroscopic device for performing a spectroscopy of the supercritical or subcritical fluid. In this way, it is possible to accurately detect the completion of the plasticizer extraction/removal process through in situ observation.

A method for measuring a concentration of a plasticizer of the present invention is a method for measuring a concentration of a plasticizer in a compact that is obtained by compacting a mixture of an inorganic substance and an organic substance including the plasticizer and a binder, the method including the step of evaluating a concentration distribution of the plasticizer in the compact by using a microscopic laser Raman spectroscopy method.

With this method, it is possible to detect, with a high sensitivity, benzene rings and ester groups that are often not contained in a binder or an inorganic substance, by utilizing the characteristics of laser Raman light.

A relative concentration distribution may be obtained by calculating a relative intensity by normalizing an intensity of a plasticizer-induced absorption band peak of the Raman spectrum with respect to an intensity of an inorganic substance-induced absorption band peak.

An evaluation method of the present invention is an evaluation method for evaluating a volume of a substance in a supercritical or subcritical fluid, the substance being soluble in the fluid, the method including the steps of: (a) placing a transparent tubular member in which the substance has been introduced in a pressure chamber capable of maintaining the fluid in a supercritical or subcritical state; (b) measuring a length of a region of the tubular member over which the substance is present for each of various pressure values while changing a pressure in the pressure chamber to various values under a predetermined temperature by supplying the fluid into the pressure chamber; and (c) obtaining a pressure dependency of the volume of the substance in the fluid based on measurement results obtained in the step (b).

Where a substance, which is an object to be measured, is contained in a compact or a member, it is possible with this method to determine the conditions under which structural defects occur in the compact or the member due to a volumetric expansion of the substance. Thus, it is possible to appropriately determine the conditions for the process of manufacturing a component such as a multilayer ceramic component or capacitor.

An evaluation apparatus of the present invention includes: a pressure chamber capable of maintaining a fluid in a supercritical or subcritical state; a supply device for supplying the fluid; a temperature control device for controlling a temperature of the pressure chamber; a pressure control device for controlling a pressure of the pressure chamber; and a window member provided in a portion of the pressure chamber, the window member allowing light from an inside of the pressure chamber to be transmitted therethrough to an outside of the pressure chamber.

In this way, it is possible to accurately grasp the behavior of the object in a supercritical or subcritical fluid, thereby obtaining important indices for determining the manufacturing process conditions. Moreover, the evaluation apparatus can be used in the manufacturing process, in which case it is possible to perform a process using a supercritical or subcritical fluid while observing the inside of the apparatus in situ.

The evaluation apparatus may further include: a transparent tubular member placed in the pressure chamber wherein the substance can be introduced into the tubular member; and means for measuring a region of the tubular member over which the substance is present. In this way, it is possible to measure a change in the volume of the organic substance.

BRIEF DESCRIPTION OF THE DRAWINGS

FIG. 7 is a graph illustrating a pressure dependency of a plasticizer extraction/removal rate when using a supercritical carbon dioxide at a temperature of 150° C. according to the first embodiment.

DESCRIPTION OF THE PREFERRED EMBODIMENTS

First Embodiment

Figure 10:
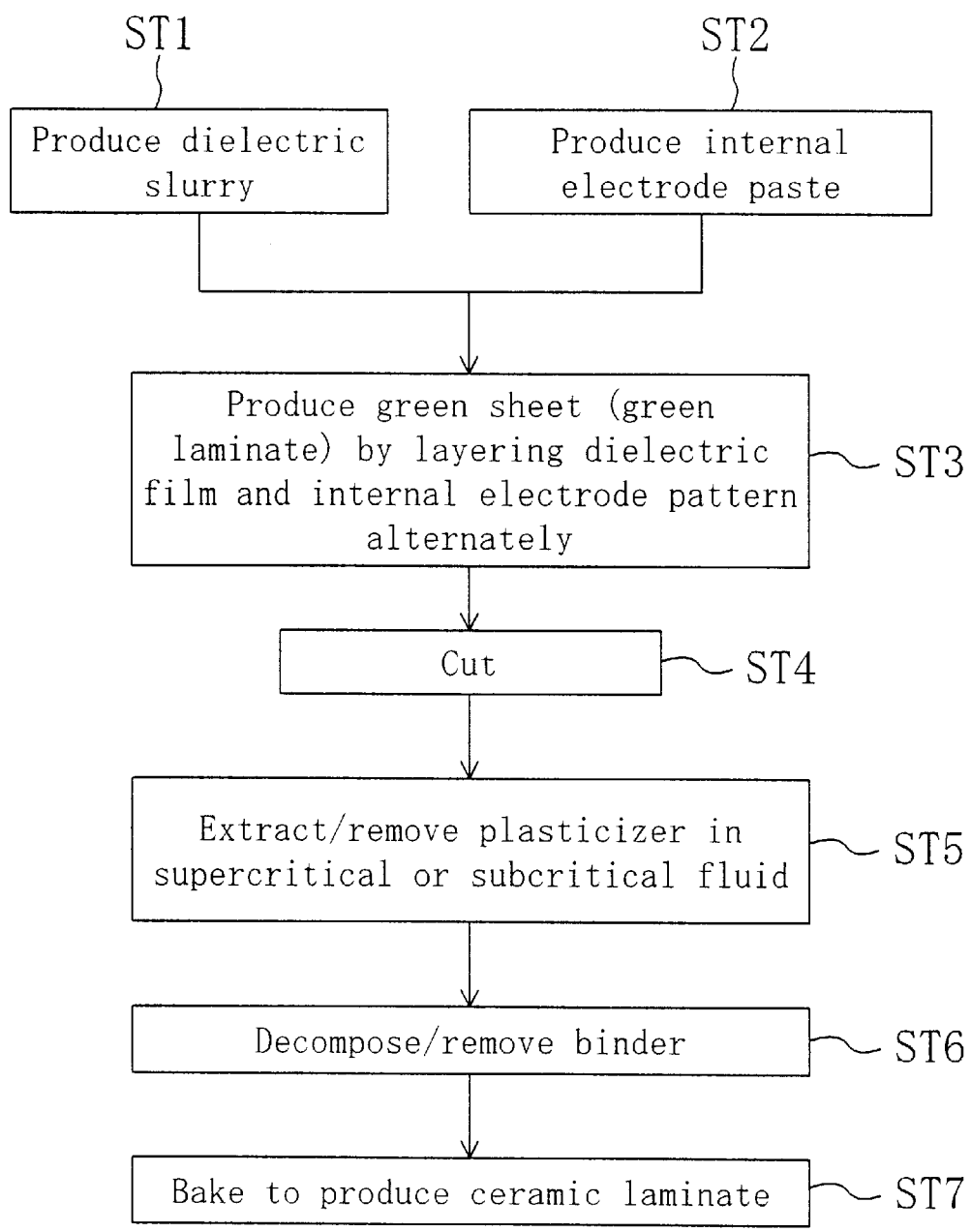
FIG. 10 is a flow chart illustrating a process of manufacturing a ceramic laminate according to the first and second embodiments of the present invention.

A method for manufacturing a ceramic laminate including a green laminate degreasing step using a supercritical fluid according to a first embodiment of the present invention will now be described with reference to FIG. 10 (the term "supercritical fluid" as used herein refers to a fluid in a supercritical state). FIG. 10 is a flow chart illustrating the manufacturing process of a ceramic laminate (sinter) according to the present embodiment and the second embodiment to be described later.

First, in step ST1, a dielectric material powder, a binder, a plasticizer, a dispersant, a solvent, etc., are mixed together and stirred to produce a dielectric slurry having an appropriate viscosity. In this step, barium titanate may be used for the ceramic dielectric material, a butyral resin such as polyvinyl butyral, an acrylic resin, a polypropylene or a polyethylene for the binder, an ester such as dibutyl phthalate or butylbenzylphthalate, stearic acid, stearyl alcohol or a paraffin for the plasticizer, an anionic surfactant such as carboxylate for the dispersant, and an ester such as butyl acetate, an alcohol, an ether or a hydrocarbon for the solvent. On the other hand, in step ST2, an internal electrode paste is produced by mixing a metal powder such as nickel (Ni) or palladium (Pd) and an organic substance together into a paste.

Then, in step ST3, a dielectric film is produced by directly screen-printing the dielectric slurry using a print laminator, or the like. Then, an internal electrode pattern is produced similarly by directly screen-printing the internal electrode paste using a different screen. The screen printing process for a dielectric film and an internal electrode pattern as described above is repeated for a desired number of times so as to produce a green sheet (green laminate) including internal electrodes and dielectric films alternating with each other, and then the green sheet is subjected to a preliminary pressing step.

In step ST4, after completion of the preliminary pressing step, the green sheet is cut into pieces according to the size of each printed chip, thereby obtaining separate green laminates 100.

Figure 1:
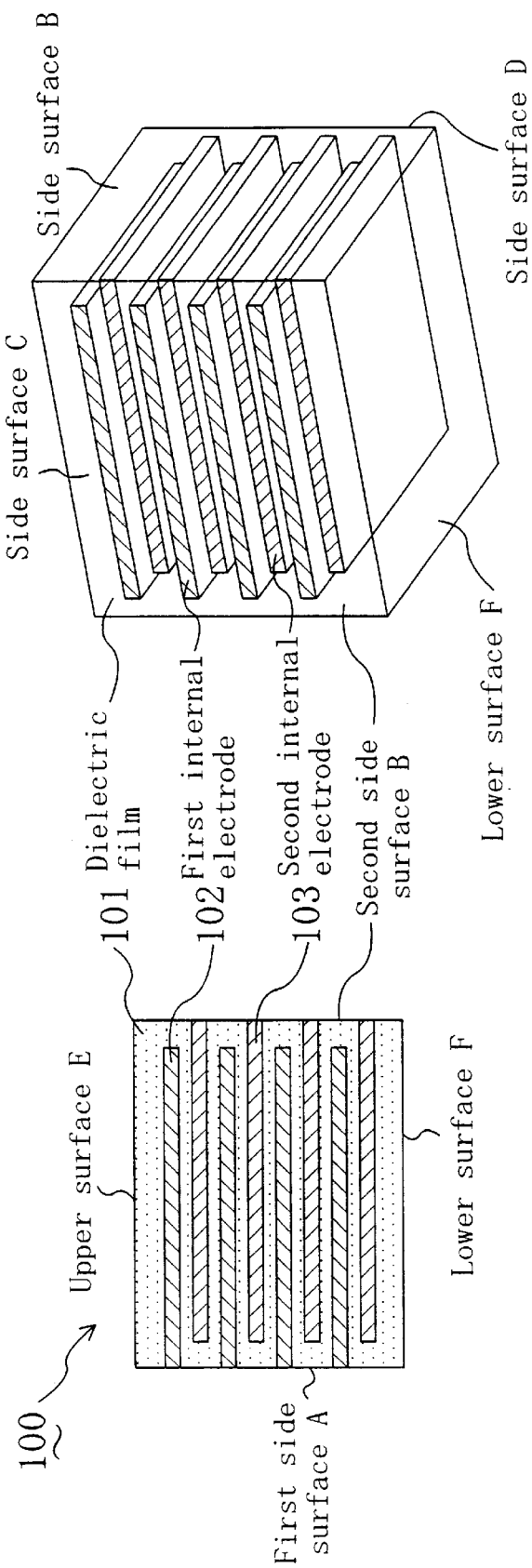
FIG. 1A is a cross-sectional view illustrating a green laminate produced in the manufacturing process of a first embodiment of the present invention.
FIG. 1B is a perspective view illustrating the green laminate produced in the manufacturing process of the first embodiment.

FIG. 1A and FIG. 1B are a cross-sectional view and a perspective view, respectively, illustrating the green laminate 100 produced through the steps described above. As illustrated in FIG. 1A, the green laminate 100 includes a dielectric film 101, first internal electrodes 102 whose proximal end is exposed on a first side surface A (one side surface) and whose distal end extends to a position near a second side surface B (the other side surface) opposing the first side surface A, and second internal electrodes 103 whose proximal end is exposed on the second side surface B and whose distal end extends to a position near the first side surface A. The respective layers of the dielectric film 101, the first internal electrodes 102 and the second internal electrodes 103 are layered on one another. In the present embodiment, the first internal electrodes 102 and the second internal electrodes 103 are made of the same material, and have the same thickness and the same area. A region between the distal end of each first internal electrode 102 and the side surface A, and a region between the distal end of each second internal electrode 103 and the side surface B, are filled with the dielectric film 101. In other words, the internal electrodes 102 and 103 extend through the dielectric film 101 as a matrix and in parallel to an upper surface E and a lower surface F while being exposed alternately on the side surfaces A and B. The upper surface E and the lower surface F are defined in the surface of the dielectric film 101. Edge surfaces of the internal electrodes 102 and 103 are exposed on two side surfaces C and D of the green laminate 100 that are orthogonal to the side surfaces A and B.

Then, in step ST5 of FIG. 10, the green laminate 100 is placed in a pressure chamber 121 through which a supercritical fluid flows, and subjected to a de-plasticizer process.

Figure 2:
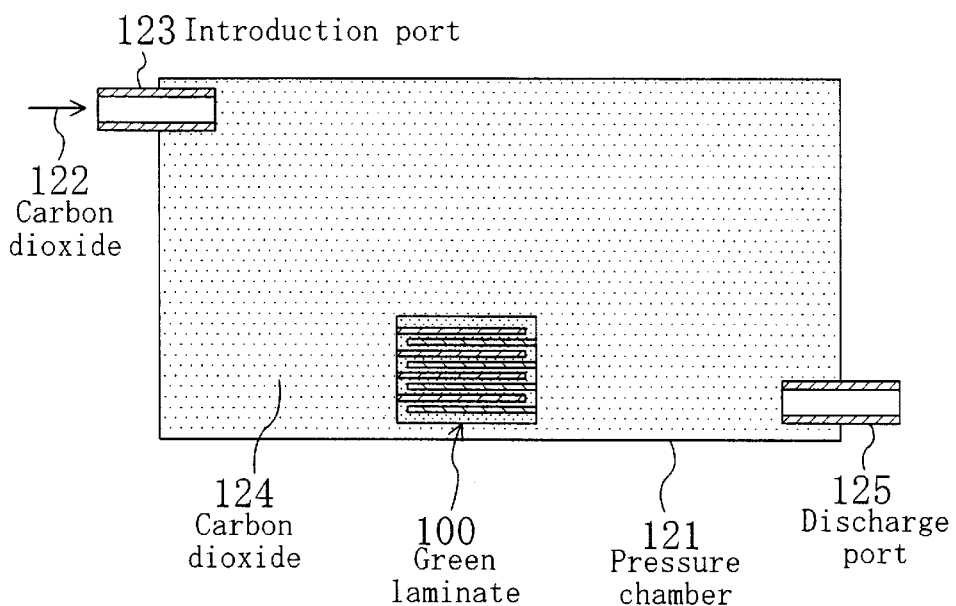
FIG. 2 is a diagram illustrating the green laminate being placed in a pressure chamber through which a supercritical fluid flows in the manufacturing process of the first embodiment.

FIG. 2 is a diagram illustrating the green laminate 100 being placed in the pressure chamber 121 through which a supercritical fluid flows. The pressure chamber 121 is provided with an introduction port 123 for introducing therethrough a fluid to be turned into a supercritical state, and a discharge port 125 for discharging a supercritical fluid therethrough. Although not shown in FIG. 2, a gas cylinder, a liquid pump, a temperature adjustment device, a pressurizing device, a pressure control device, etc., are provided outside the pressure chamber 121, as will be described later with reference to FIG. 9. When a number of green laminates 100 are placed in the pressure chamber 121, it is preferred to use a case, or the like, as described above, so as to ensure a space between the green laminates 100. This is for efficiently extracting the plasticizer by contacting the surface of each green laminate 100 with the supercritical fluid as much as possible.

Then, after the temperature of the pressure chamber 121 is set to 40° C., a carbon dioxide 122 in a gas state is gradually introduced through the introduction port 123, after which the carbon dioxide is pressurized in the pressure chamber 121 to 10 MPa. In this process, the pressure should not be changed rapidly, but it is generally preferred that the pressure is increased at a pressure changing rate of 10 MPa/hour or less so as to suppress the occurrence of structural defects in the green laminate 100. However, since the upper limit of the pressure changing rate varies significantly depending on the size of the green laminate 100 and the conditions of the preliminary pressing process described above, the pressure changing rate needs to be optimized according to the size of the green laminate 100 and the conditions of the preliminary pressing process described above.

Figure 4:
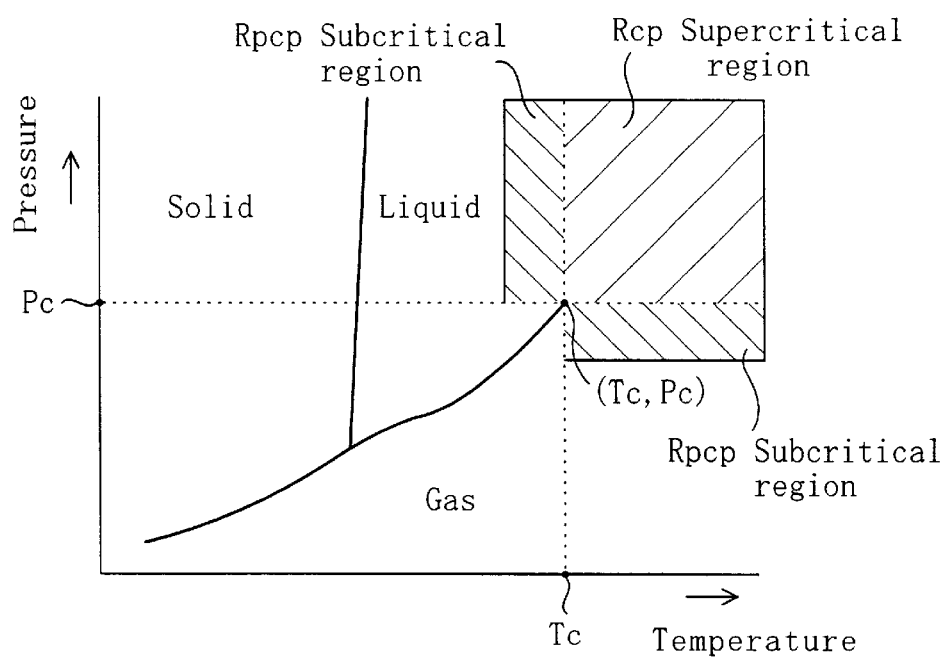
FIG. 4 is a temperature versus pressure graph illustrating the state of carbon dioxide that is used as a supercritical or subcritical fluid in various embodiments of the present invention.

FIG. 4 is a phase diagram of carbon dioxide, wherein the horizontal axis represents the temperature and the vertical axis represents the pressure. Point (Tc, Pc) where the temperature is at the critical temperature Tc and the pressure is at the critical pressure Pc is the critical point. The region where the temperature is equal to or greater than the critical temperature Tc and the pressure is equal to or greater than the critical pressure Pc is a supercritical region Rcp. The region where the temperature is equal to or greater than the critical temperature Tc and the pressure is slightly lower than the critical pressure Pc, and the region where the pressure is equal to or greater than the critical pressure Pc and the temperature is slightly lower than the critical temperature Tc, are subcritical regions Rpcp. In the supercritical region Rcp, carbon dioxide is in a supercritical state (supercritical fluid), which is a phase different from the gaseous, solid and liquid phases. It is known that a substance in the supercritical state exhibits characteristics different from those of a gas, a solid and a liquid.

The critical temperature Tc of carbon dioxide is 31.0° C. and the critical pressure Pc thereof is 7.4 MPa. Therefore, carbon dioxide 124 is substantially completely in a supercritical state when the temperature and the pressure of the carbon dioxide 124 in the pressure chamber 121 are set to 40° C. and 10 MPa, respectively.

Then, even after the pressure in the pressure chamber 121 reaches 10 MPa, the carbon dioxide 122 in a supercritical state is introduced through the introduction port 123. After the pressure in the pressure chamber 121 becomes stable at 10 MPa, the state is kept for about 100 minutes, thereby performing the de-plasticizer process, i.e., a process of extracting/removing the plasticizer from the green laminate 100 by using the supercritical carbon dioxide 124. Since the dielectric film 101 and the internal electrodes 102 and 103 in the green laminate 100 have different thermal expansion coefficients, a very small gap is formed between the dielectric film 101 and each of the internal electrodes 102 and 103 at 40° C. The supercritical carbon dioxide 124 permeates into the green laminate 100 through the gaps, whereby the plasticizer inside the green laminate 100 (particularly the plasticizer in the dielectric film 101) excluding that present in surface portions of the green laminate 100, is extracted/removed to the outside primarily through the gaps between the dielectric film and the internal electrodes.

As described above, the permeation of the supercritical fluid into the green laminate 100 and the outflow of the supercritical fluid and the plasticizer from the inside of the green laminate 100 occur primarily through the gaps between the dielectric film and the internal electrodes. Therefore, a stress is unlikely to occur in the green laminate 100, whereby it is possible to rapidly evaporate, decompose, and remove the plasticizer without causing structural defects in the dielectric film 101.

Then, the supercritical carbon dioxide 124 containing the extracted plasticizer is discharged from the pressure chamber 121 through the discharge port 125. After completion of the process of extracting/removing the plasticizer from the green laminate 100 (the de-plasticizer step), the pressure in the pressure chamber 121 is reduced first. Again, the pressure should not be changed rapidly, but it is generally preferred that the pressure is reduced at a pressure changing rate of 10 MPa/hour or less so as to suppress the occurrence of structural defects in the green laminate 100.

Then, after the pressure in the pressure chamber 121 returns to a normal pressure, the temperature is decreased to room temperature, after which the green laminate 100 is taken out of the pressure chamber 121.

Then, in steps ST6 and ST7 of FIG. 10, the green laminate 100 is subjected to a de-binder step and a baking step. Since the plasticizer has already been removed, the formation of a graphite-like substance in the green laminate 100 is suppressed even if the temperature is rapidly increased in the de-binder step and in the baking step. Thus, it is no longer necessary to slowly increase and decrease the temperature through a temperature range of 150 to 300° C. over a time period of 20 hours to several days, as in the prior art.

Figure 3:
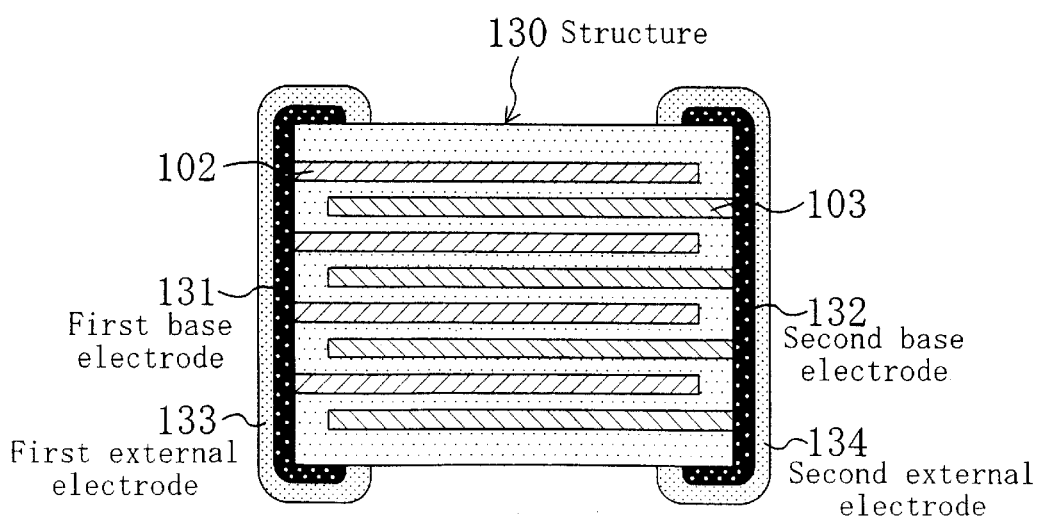
FIG. 3 is a cross-sectional view illustrating a structure that is produced upon completion of a green laminate baking step in the manufacturing process of the first embodiment.

Then, as illustrated in FIG. 3, after completion of the baking step, the dielectric film 101 and the internal electrodes 102 and 103 in the green laminate 100 are turned into a strong structure through a solid phase reaction, or the like, thereby producing a structure 130 (sinter), which is a main component of a capacitor. Then, the surface of the structure 130 is polished at necessary positions, after which an Ag film is applied thereon and baked so as to form a first base electrode 131 on the first side surface A and a second base electrode 132 on the second side surface B. Then, a first external electrode 133 and a second external electrode 134 are formed on the first base electrode 131 and the second base electrode 132, respectively, by depositing a solder (SnPb) through an electroplating process. In this way, the plurality of first internal electrodes 102 are connected to the first external electrode 133, and the plurality of second internal electrodes 103 are connected to the second external electrode 134, thus obtaining a ceramic laminate.

In the present embodiment, the plasticizer is selectively extracted/removed from the green laminate 100 by using a supercritical fluid before the de-binder step, whereby it is possible to suppress the formation of a graphite-like substance even if the temperature is increased rapidly in the subsequent de-binder step and the baking step. Therefore, it is possible to increase the manufacturing efficiency without reducing the manufacturing yield or the performance of the product. Moreover, the other binder components are extracted/removed to the outside through the gaps that are formed in the de-plasticizer step, thereby preventing the internal stress from increasing. Therefore, structural defects will not be induced by the de-binder step after the degreasing step.

Figure 5:
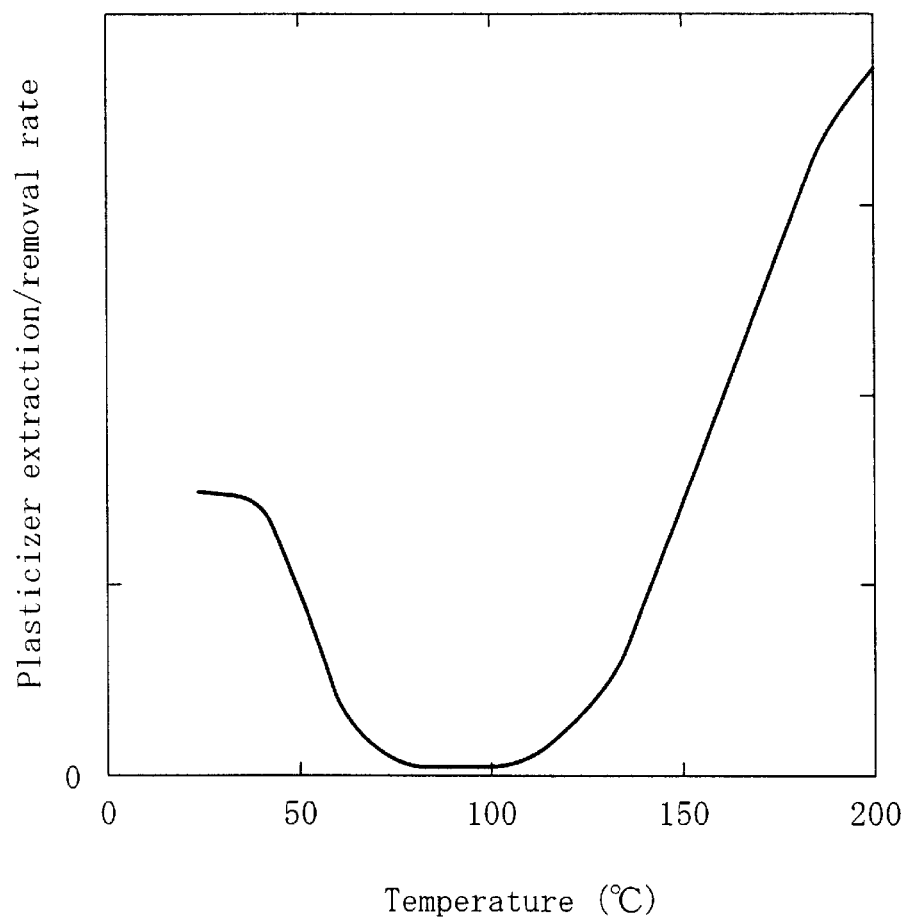
FIG. 5 is a graph illustrating a temperature dependency of a plasticizer extraction/removal rate in a pressure chamber according to the first embodiment.

Next, optimal conditions for the de-plasticizer step will be described. FIG. 5 is a graph illustrating a temperature dependency of a plasticizer extraction/removal rate when the pressure in the pressure chamber is 10 MPa. As illustrated in the figure, at temperatures of 40° C. or less, the plasticizer extraction rate is considerably high, and the plasticizer can be extracted/removed with a high efficiency as described above in the present embodiment. As the temperature increases from 40° C., the plasticizer extraction rate decreases. Particularly, the plasticizer extraction/removal rate is low when the temperature of carbon dioxide is in the range from 50° C. to 140° C., with the rate being lowest in the range from 80° C. to 100° C. However, the plasticizer extraction/removal rate increases again when the temperature of carbon dioxide exceeds 100° C. A rapid plasticizer extraction/removal process can be performed when the temperature of carbon dioxide reaches about 150° C.

It has been empirically found in the present invention that where one attempts to efficiently extract/remove substantially only the plasticizer from a green laminate including dielectric layers containing a ceramic powder, a binder, a plasticizer, etc., and metal electrodes, layered on one another, there is a region of a poor removal efficiency as illustrated in FIG. 5. Thus, it is preferred that the plasticizer extraction/removal process is performed in the range from room temperature to 50° C. or in the range from 140° C. to a de-binder temperature. In order to realize a higher plasticizer extraction/removal efficiency, it is preferred that the de-plasticizer process is performed in the range from room temperature to 40° C. or in the range from 150° C. to a de-binder temperature. The range of room temperature to 40° C. is most preferred, with which the amount of time required for raising the temperature can be reduced.

In the present embodiment, a supercritical carbon dioxide is used alone in the plasticizer extraction/removal step. However, in some cases, it is possible to extract/remove the plasticizer at a higher rate and with a higher efficiency by mixing the supercritical carbon dioxide with an appropriate amount of another substance as an entrainer (extraction assistant). The entrainer may be an alcohol such as methanol or ethanol, a ketone such as acetone, or a hydrocarbon such as methane or ethane.

Figure 6:
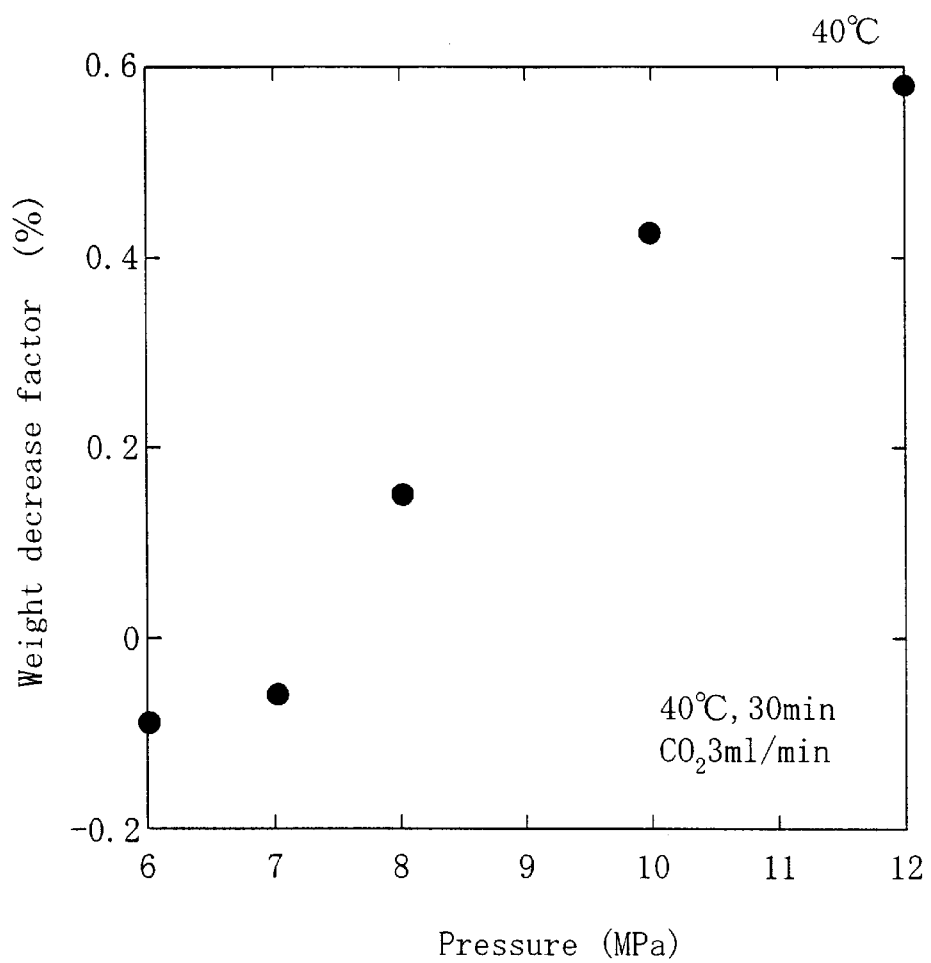
FIG. 6 is graph illustrating a pressure dependency of a plasticizer extraction/removal rate when using a supercritical carbon dioxide at a temperature of 40° C. according to the first embodiment.

FIG. 6 is a diagram illustrating a pressure dependency of a plasticizer extraction rate when using a supercritical carbon dioxide at a temperature of 40° C. FIG. 7 is a graph illustrating a pressure dependency of a plasticizer extraction rate when using a supercritical carbon dioxide at a temperature of 150° C. In FIG. 6 and FIG. 7, the horizontal axis represents the pressure of carbon dioxide in the pressure chamber, and the vertical axis represents the amount of plasticizer extracted/removed in terms of a decrease in the weight of the green laminate. As illustrated in FIG. 6 and FIG. 7, the plasticizer extraction/removal rate increases as the pressure of carbon dioxide increases, while the rate of increase decreases as the pressure reaches 12 MPa. Thus, in view of the fact that the pressure chamber needs to be structurally stronger as the pressure increases, it is preferred that the pressure of carbon dioxide is in the range from 9 MPa to 12 MPa.

Figure 8A:
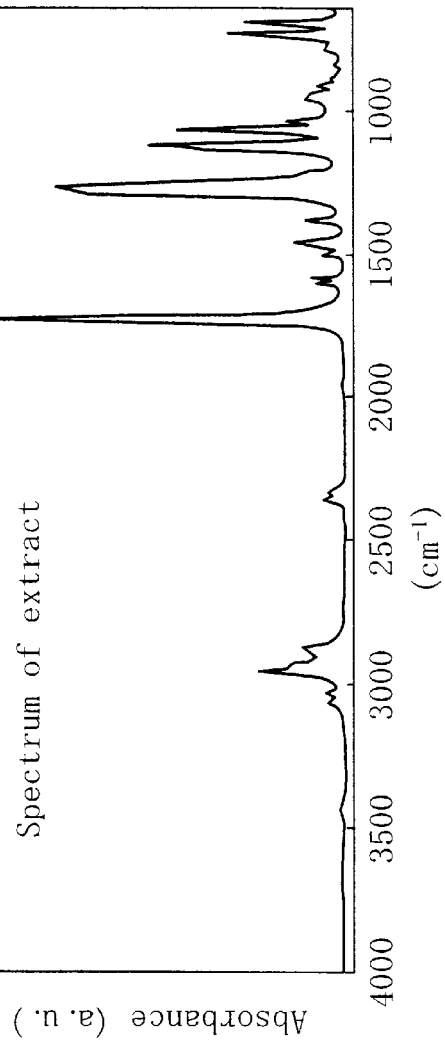
FIG. 8A shows an absorption spectrum of an extract obtained by using a supercritical carbon dioxide.
Figure 8B:
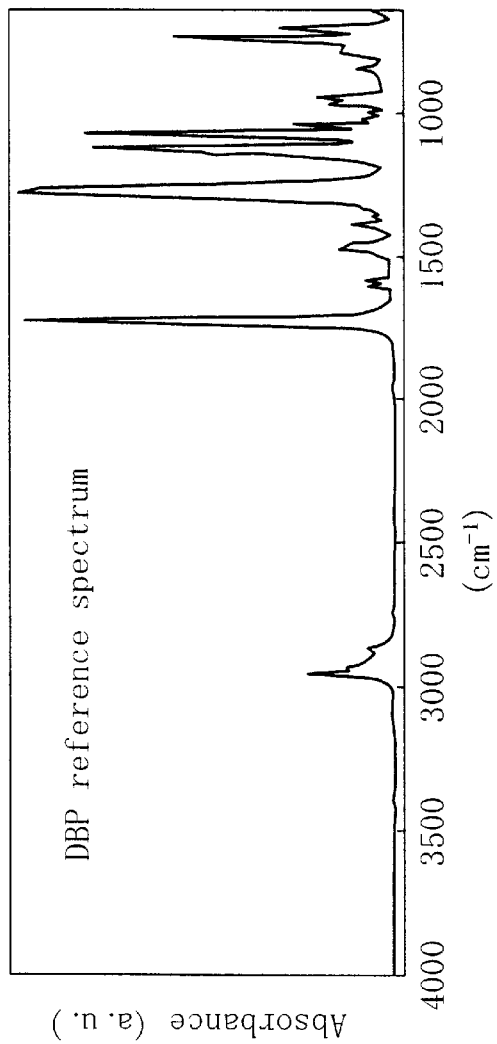
FIG. 8B shows a reference absorption spectrum of DBP (dibutyl phthalate).

FIG. 8A shows an absorption spectrum of an extract obtained by using a supercritical carbon dioxide at a temperature of 50° C., and FIG. 8B shows a reference absorption spectrum of DBP (dibutyl phthalate). A comparison between FIG. 8A and FIG. 8B shows that substantially no substance other than the plasticizer is extracted/removed. Thus, it is possible to efficiently remove the plasticizer from the green laminate while leaving the binder in the green laminate by employing the de-plasticizer process of the present embodiment.

In the present embodiment, the supercritical carbon dioxide 124 discharged from the pressure chamber 121 through the discharge port 125 illustrated in FIG. 2 is turned into a gaseous state as its pressure decreases. At this time, the carbon dioxide is at a relatively low temperature and thus has a reduced solubility to the plasticizer, whereby the gaseous carbon dioxide and the liquid plasticizer can be easily separated from each other. Thus, the plasticizer is collected in a liquid state with a relatively high purity, and thus can be reused. On the other hand, the carbon dioxide that has turned back into a gaseous state can be pressurized by using a pressurizing device, or the like, so that it can be reused for the formation of the green laminate 100. Thus, it is possible to suppress the amount of carbon dioxide discharged into the atmospheric air to a very small amount.

As described above, with the conventional degreasing step through thermal decomposition in the air, an organic substance may be present in the hot gas discharged in the degreasing step of simultaneously removing the plasticizer and the binder. Therefore, it is necessary to remove the organic substance in the gas by, for example, completely decomposing and incinerating the organic substance or adsorbing it onto another substance, thus increasing the manufacturing cost. Moreover, chemical substances including benzene rings may deposit on an apparatus or a pipe, thus increasing the maintenance cost.

In contrast, in the present embodiment, the gaseous carbon dioxide and the plasticizer can be easily separated from each other by utilizing the significant decrease in the solubility of the supercritical carbon dioxide to the plasticizer as the supercritical carbon dioxide is turned into a gaseous state due to a decrease in the pressure thereof. Therefore, it is possible to collect and reuse the plasticizer, thereby preventing possible environmental problems, and thus reducing the cost.

While Ni, Pd, or the like, is used as the material of the internal electrodes 102 and 103 of the green laminate 100 in the present embodiment, some combinations of the metal material of the internal electrodes and the material of the plasticizer may facilitate the extraction/removal of the plasticizer with the surface of the metal material functioning as a catalyst. This phenomenon is prominent particularly in a high temperature region where the catalytic action is increased, and the plasticizer may be extracted/removed at a very high rate at a temperature of 150° C. or more. Metal materials with which a prominent catalytic effect can be expected include Pt, Pd, Ni, and the like.

In the present embodiment, the process is controlled so that the carbon dioxide 122 is supplied at a constant flow rate and the pressure in the pressure chamber 121 is kept constant. However, in order to efficiently extract/remove the plasticizer from the inside of the green laminate 100, it may be better to slightly fluctuate the pressure in the pressure chamber 121 so as to vibrate the pressure chamber 121. The pressure in the pressure chamber 121 can be slightly fluctuated by, for example, changing the flow rate of the carbon dioxide 122 with time, or by changing the predetermined pressure value of a pressure control device 161 (e.g., a relief valve) that controls the pressure of the pressure chamber 121 with time. Alternatively, ultrasonic waves may be applied to a portion of the pressure chamber 121 so as to locally fluctuate the pressure.

In the present embodiment, carbon dioxide in the supercritical region whose temperature and pressure are respectively equal to or greater than the critical temperature Tc and the critical pressure Pc at the critical point is used. However, depending on the type and the decomposition temperature of a plasticizer to be extracted/removed, carbon dioxide in a subcritical region, where only one of the temperature and the pressure exceeds the critical point, may be used if there are restrictions on the temperature or the pressure of carbon dioxide. In such a case, the extraction/removal efficiency may decrease, but there is an advantage in that a plasticizer that would otherwise be decomposed in the supercritical region may be collected without being decomposed, thereby allowing the plasticizer to be recycled. Moreover, depending on the type of plasticizer, a hydrocarbon such as ethane or a polyhalogenated hydrocarbon such as tetrafloroethylene may be used in a supercritical or subcritical state as a main solvent.

Second Embodiment

Figure 9:
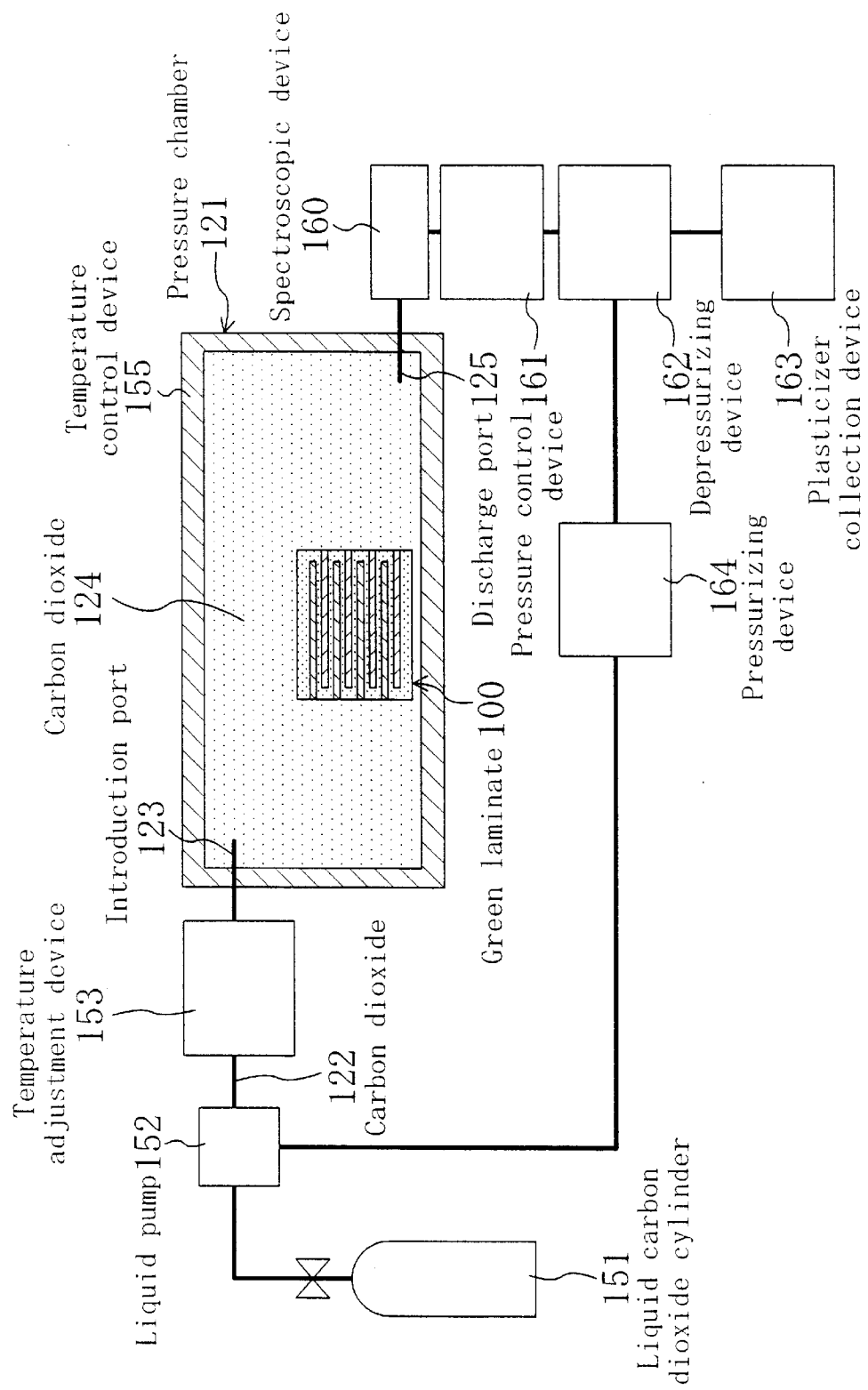
FIG. 9 is a diagram schematically illustrating a structure of an apparatus for manufacturing a laminate according to a second embodiment of the present invention.

FIG. 9 is a diagram schematically illustrating a structure of an apparatus for manufacturing a laminate according to a second embodiment using the method of the present invention. The manufacturing apparatus is used for extracting/removing a plasticizer, and includes in addition to the pressure chamber 121 illustrated in FIG. 2: a liquid carbon dioxide cylinder 151, which is a source of carbon dioxide; a liquid pump 152 for pressurizing the liquid carbon dioxide 122; a temperature adjustment device 153 for adjusting the temperature of the carbon dioxide 122 supplied into the pressure chamber 121; a temperature control device 155 including a heater, a cooler, etc., for directly controlling the temperature of the pressure chamber 121; a spectroscopic device 160 for detecting the completion of the plasticizer extraction/removal process; a pressure control device 161 including a relief valve for controlling the pressure in the pressure chamber 121; a depressurizing device 162 for discharging the supercritical carbon dioxide 124 from the pressure chamber 121; a plasticizer collection device 163; and a pressurizing device 164 for pressurizing the gaseous carbon dioxide taken out from the depressurizing device 162.

The procedure of the de-plasticizer process performed in the manufacturing apparatus will now be described. First, the green laminate 100 is placed in the pressure chamber 121, and the temperature in a pressure chamber 205 is kept at 40° C. by the temperature control device 155. Then, a liquid carbon dioxide is pumped up from the liquid carbon dioxide cylinder 151 by the liquid pump 152, and the temperature of the liquid carbon dioxide 122 is increased to 40° C. by the temperature adjustment device 153, after which the carbon dioxide 122 is introduced into the pressure chamber 121 through the introduction port 123. Then, the temperature and the pressure in the pressure chamber 121 are controlled by the temperature control device 155 and the pressure control device 161 to a condition such that carbon dioxide is turned into a supercritical or subcritical state (40° C. and 10 MPa in the present embodiment). As a result, the pressure chamber 121 is filled with the supercritical carbon dioxide 124.

Then, the supercritical carbon dioxide 124 containing the plasticizer that has been extracted/removed from the green laminate 100 is passed to the pressure control device 161 through the discharge port 125, and then passed to the depressurizing device 162 continuously by appropriate amounts so that the pressure in the pressure chamber 121 is kept unchanged. In the depressurizing device 162, the supercritical carbon dioxide 124 is turned into a gaseous carbon dioxide due to a decrease in the pressure thereof. At this time, the solubility of the carbon dioxide to the plasticizer decreases rapidly and the temperature thereof is as low as about 50° C., whereby the liquid plasticizer is separated from the gaseous carbon dioxide so as to be collected in the plasticizer collection device 163. The carbon dioxide that has been turned back into a gaseous state is pressurized again by the pressurizing device 164 and passed to the liquid pump 152, while it is condensed back into a liquid so as to be reused. On the other hand, the plasticizer that has been collected in the plasticizer collection device 163 can be reused for the formation of the green laminate 100.

Where a fluid whose normal state is the liquid state is used in a supercritical or subcritical state, the fluid can be easily separated from a plasticizer if the plasticizer is a solid. Where carbon dioxide, whose normal state is the gaseous state, is used as in the present embodiment, it can be easily separated from a plasticizer if the plasticizer is a liquid or a solid. Even if the fluid is in a subcritical state, the fluid and the plasticizer can be easily separated from each other as long as the condition of the fluid is in a range such that its capability of dissolving the plasticizer is lost. Therefore, it may not be always necessary to depressurize the fluid to its normal state so that the plasticizer can be collected.

As described above, with the conventional degreasing step through thermal decomposition in the air, an organic substance may be present in the hot gas discharged in the degreasing step of simultaneously removing the plasticizer and the binder. Therefore, it is necessary to remove the organic substance in the gas by, for example, completely decomposing and incinerating the organic substance or adsorbing it onto another substance, thus increasing the manufacturing cost. In contrast, in the present embodiment, the gaseous carbon dioxide and the plasticizer can be easily separated from each other by utilizing the significant decrease in the solubility of the supercritical carbon dioxide to the plasticizer as the supercritical carbon dioxide is turned into a gaseous state due to a decrease in the pressure thereof. Therefore, it is possible to collect and reuse the plasticizer, thereby preventing possible environmental problems, and thus reducing the cost.

While an ester such as dibutyl phthalate or butylbenzylphthalate is typically used as the plasticizer for the formation of the green laminate, these substances have an absorption band in the ultraviolet region. Therefore, the concentration of the plasticizer in the fluid can be known by performing an in situ spectroscopic analysis of the discharged supercritical fluid (the carbon dioxide 124) in the ultraviolet region with the spectroscopic device 160 provided between the discharge port 125 and the pressure control device 161, as illustrated in FIG. 9. Specifically, a particular absorption band in the ultraviolet region is detected while the plasticizer is being extracted/removed, and the particular absorption band will no longer be detected after the plasticizer extraction/removal is substantially completed. In this way, it is possible to spectroscopically detect the completion of the plasticizer extraction/removal process. The spectroscopic device 160 may not have to be provided between the discharge port 125 and the pressure control device 161, but may alternatively be attached directly to the pressure chamber 121, for example, to provide the same function as described above.

While a dielectric powder, a binder, a plasticizer, etc., are typically contained in the internal electrodes in the green laminate, they may not be contained in the internal electrodes depending on the type of the multilayer ceramic component.

As described above, of the high temperature region and the low temperature region that are defined with respect to the temperature range of 80° C. to 100° C. illustrated in FIG. 5, low temperature region is preferably employed for the de-plasticizer process in view of the process. In the low temperature region, however, the binder is not flexible, whereby a crack may occur in the green laminate upon extraction/removal of the plasticizer. Therefore, where the plasticizer extraction/removal process is performed in a temperature range within the low temperature region, it is preferred to add a slight amount of an alcohol, or the like, that is soluble in carbon dioxide and has a good affinity to a macromolecule so as to maintain a flexibility of the dielectric layer and prevent a crack, or the like, from occurring in the green laminate.

Third Embodiment

Experiments for Determining Suitable Conditions

As described above, with the first embodiment described above, it is possible to improve the manufacturing efficiency while suppressing the deterioration in quality due to the occurrence of structural defects in a green laminate and thus a ceramic laminate (sinter). One possible factor may be the plasticizer concentration in the dielectric layer and that in the internal electrodes in the green laminate being substantially uniform during the de-plasticizer step because the de-plasticizer step is performed at a relatively low temperature in the first embodiment. However, it is necessary to examine a little further as to whether any problem occurs under various conditions. In view of this, the suitable conditions were determined as follows.

Figure 11A:
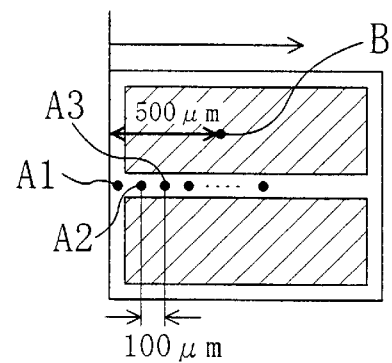
FIG. 11A is a cross-sectional view of a green laminate for illustrating measurement points that are used in determining the suitable conditions for the present invention.
Figure 11B:
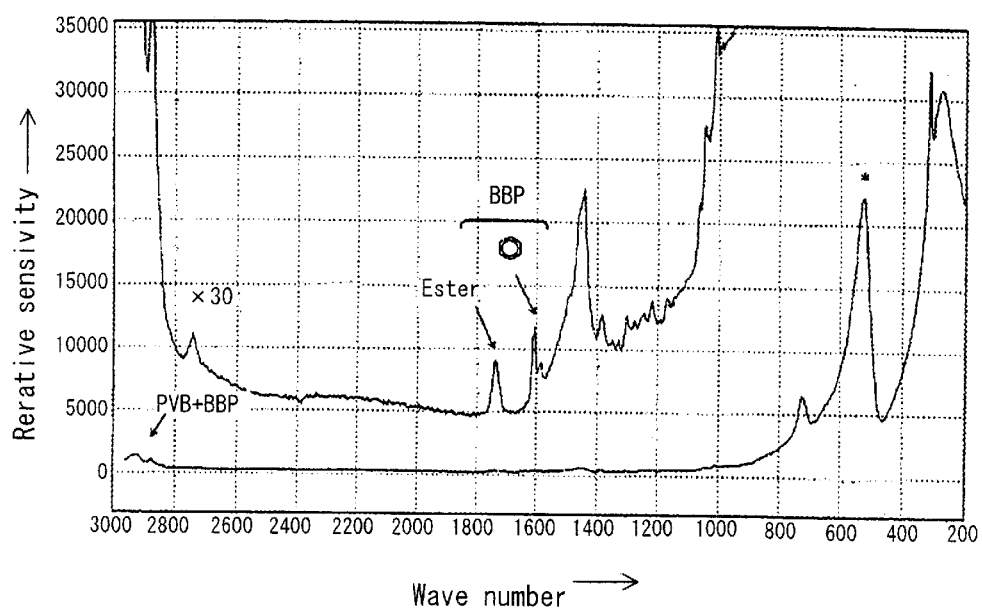
FIG. 11B shows a Raman spectrum from an unprocessed sample.

FIG. 11A is a cross-sectional view of a green laminate for illustrating measurement points that are used in determining the suitable conditions for the present invention, and FIG. 11B is a Raman spectrum from an unprocessed sample.

FIG. 11A is a cross-sectional view illustrating a green laminate of a large capacity type as it is substantially bisected in the direction perpendicular to the primary plane of the internal electrodes. As illustrated in the figure, the plasticizer concentration was evaluated at various points A1, A2, A3, . . . , along the center line of the dielectric layer in the green laminate at regular intervals of 100 $\mu$m starting from one end of the sample. Moreover, the plasticizer concentration was also evaluated at point B that is in an internal electrode (a nickel layer) and at a distance of 500 $\mu$m from the end of the sample. Since the green laminate contains, in addition to the plasticizer, various organic substances such as a binder and inorganic substances such as a ceramics powder, it is difficult with an elementary analysis method to accurately evaluate the plasticizer concentration due to the presence of the organic substances such as a binder. While a green laminate of this type employs BBP containing benzene rings and ester groups as the plasticizer, benzene rings or ester groups are not contained in other organic substances such as a binder. Therefore, it is possible to evaluate the BBP concentration if the concentration of benzene rings or ester groups can be evaluated. It has been found that the concentration of benzene rings or ester groups can be evaluated by using a microscopic laser Raman method.

The general principle of the microscopic laser Raman method is as follows. When laser light is illuminated onto the surface of a substance, Raman scattered light whose wavelength is $\lambda 0 \pm \lambda$ occurs in addition to scattered light whose wavelength is equal to the wavelength $\lambda 0$ of the illuminated light. The transition wavelength $\lambda$ is a value that is inherent to the substance or a functional group therein, and the amount (concentration) of the substance can be known by measuring the intensity of the transition wavelength $\lambda$. Thus, it is possible to analyze a desired minute area on the surface of a sample that is on the order of $\mu$m by illuminating laser light that is focused to a beam diameter of 1 $\mu$m onto an object to be measured and then collecting and measuring the Raman scattered light through an optical microscope. A measurement was performed by using Ar ion laser light whose wavelength is 514.5 nm as the laser light and a 100× object lens. The laser power used was in the range from 30 to 150 mw. It has been confirmed at a number of points that the Raman spectrum obtained from point A is substantially equal to that of the dielectric layer near point B.

FIG. 11B shows a Raman spectrum on the dielectric layer of an unprocessed green laminate. The Raman spectrum includes a benzene ring-induced absorption peak at 1607 $cm^{-1}$ and an ester group-induced absorption peak at 1735 $cm^{-1}$. Since the peak intensities of these peaks vary depending on the cross-sectional shape of the sample, the plasticizer concentration was evaluated while normalizing the respective peak intensities with respect to the intensity of a ceramics-induced absorption peak at 525 $cm^{-1}$, i.e., measuring the relative intensity ratio between the intensity of the benzene ring-induced absorption peak at 1607 $cm^{-1}$ and that of the ceramics-induced absorption peak at 525 $cm^{-1}$.

Figure 12A:
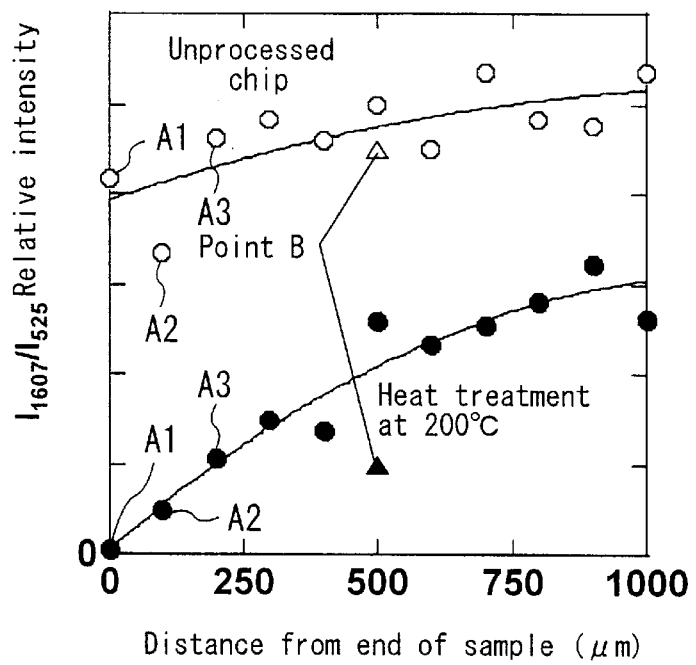
FIG. 12A shows data representing a plasticizer removing effect obtained by a conventional method.
Figure 12B:
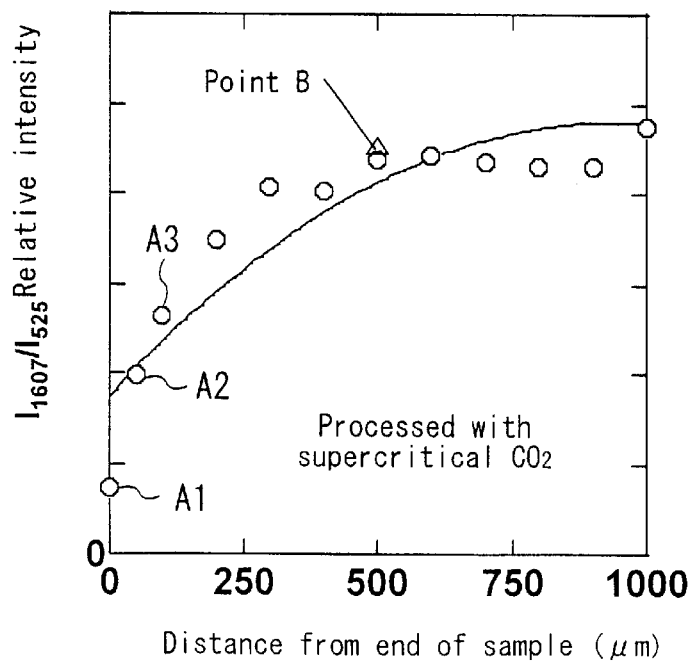
FIG. 12B shows data representing a plasticizer removing effect obtained by a method of the present invention using a supercritical or subcritical medium.

FIG. 12A and FIG. 12B show data respectively representing plasticizer removing effects obtained by a conventional method and by the method of the present invention using a supercritical or subcritical medium. In FIG. 12A and FIG. 12B, the vertical axis represents the relative intensity ratio between the 1607 $cm^{-1}$ peak intensity and the 525 $cm^{-1}$ peak intensity, and the horizontal axis represents the distance ($\mu$m) of the various measurement points from the end of the sample.

As illustrated in FIG. 12A, in an unprocessed chip, the difference in plasticizer concentration between points A1, A2, A3, . . . , in the depth direction is small, and the difference in plasticizer concentration between point B and point A7, which are at the same distance from the end of the sample, is also small. Thus, it can be said that the concentration of the plasticizer is relatively uniform in the unprocessed chip. On the other hand, in a chip that has been subjected to a heat treatment at 200° C., the concentration at point B is reduced from that at point A. It is believed that this is because the de-plasticizer process proceeded at a higher rate at point B, i.e., in an internal electrode, than in other regions, since the temperature increasing rate is higher at point B than that in other regions due to the heating.

As illustrated in FIG. 12B, in a sample that has been processed with a supercritical carbon dioxide, there is substantially no difference between the plasticizer concentration at point A and that at point B. It is believed that this is because the plasticizer in the dielectric film and that in the internal electrodes are extracted/removed at a substantially uniform rate since the process with a supercritical carbon dioxide is performed at a low temperature. Since the dielectric film layers and the internal electrodes are layered at a pitch on the order of $\mu$m, a local variation in the concentration of the plasticizer may cause structural defects to be formed in the green laminate. Therefore, it is very effective to control the plasticizer concentration to be uniform by a process using a supercritical carbon dioxide.

The method of evaluating the plasticizer concentration using a microscopic laser Raman method can be used in a variety of applications in addition to the process using a supercritical carbon dioxide. For example, the plasticizer concentration distribution in the depth direction of the green laminate can be evaluated after the heat treatment of the green laminate. In this way, if a structural defect occurs in the green laminate in a subsequent step, it is possible to know a particular plasticizer concentration distribution in the depth direction of the green laminate that causes a structural defect, whereby it is possible to optimize the process conditions and/or to estimate the limit gradient of the plasticizer concentration. Moreover, even if a defect occurs after establishment of conditions such that the process can proceed to the next step, it is possible to assume whether the cause of the defect has been in the de-plasticizer step by performing this evaluation.

Furthermore, this concentration measurement method can be used also for measuring the plasticizer concentration in a compact of a mixture of an inorganic substance other than ceramic, a plasticizer and a binder. In such a case, the relative concentration distribution can be obtained by normalizing the intensity of the plasticizer-induced absorption band peak in the Raman spectrum with the intensity of an inorganic substance-induced absorption band peak to obtain the relative intensity.

The present embodiment has been described above primarily with respect to a case where a phthalate ester such as dibutyl phthalate or butylbenzylphthalate is used as the plasticizer. As described above, a phthalate ester is a desirable plasticizer and has a high solubility in a supercritical carbon dioxide. However, structural defects may occur in the green laminate when the mixing ratio of the plasticizer, the dielectric material and the binder in the dielectric slurry used for the formation of the green to laminate, the grain diameter of the dielectric material, the condition of the preliminary pressing process performed after the formation of the green sheet, etc., are inappropriate. It is believed that the primary cause thereof is the dissolution of carbon dioxide in the phthalate ester, which is the plasticizer, while the pressure is increased, thereby increasing the volume of the phthalate ester and thus causing structural defects due to the volumetric expansion. Therefore, it is possible to suppress the occurrence of structural defects in the green laminate by quantitatively obtaining the limit value of the volumetric expansion of the phthalate ester and determining the materials of the green laminate other than the plasticizer and the conditions for forming the green laminate so that the limit value will not be reached even if the volumetric expansion occurs. Alternatively, the occurrence of structural defects in the green laminate can be suppressed by employing other plasticizers having a small volumetric expansion factor. Which one of these two methods should be employed can be determined based on the type and size of the green laminate.

Method and Apparatus for Evaluating Volumetric Expansion

The following apparatus and procedure can suitably be used for observing the behavior of a substance such as a plasticizer in a supercritical or subcritical medium (fluid) and possibly quantitatively evaluating the volumetric expansion of a plasticizer, etc.

Figure 13:
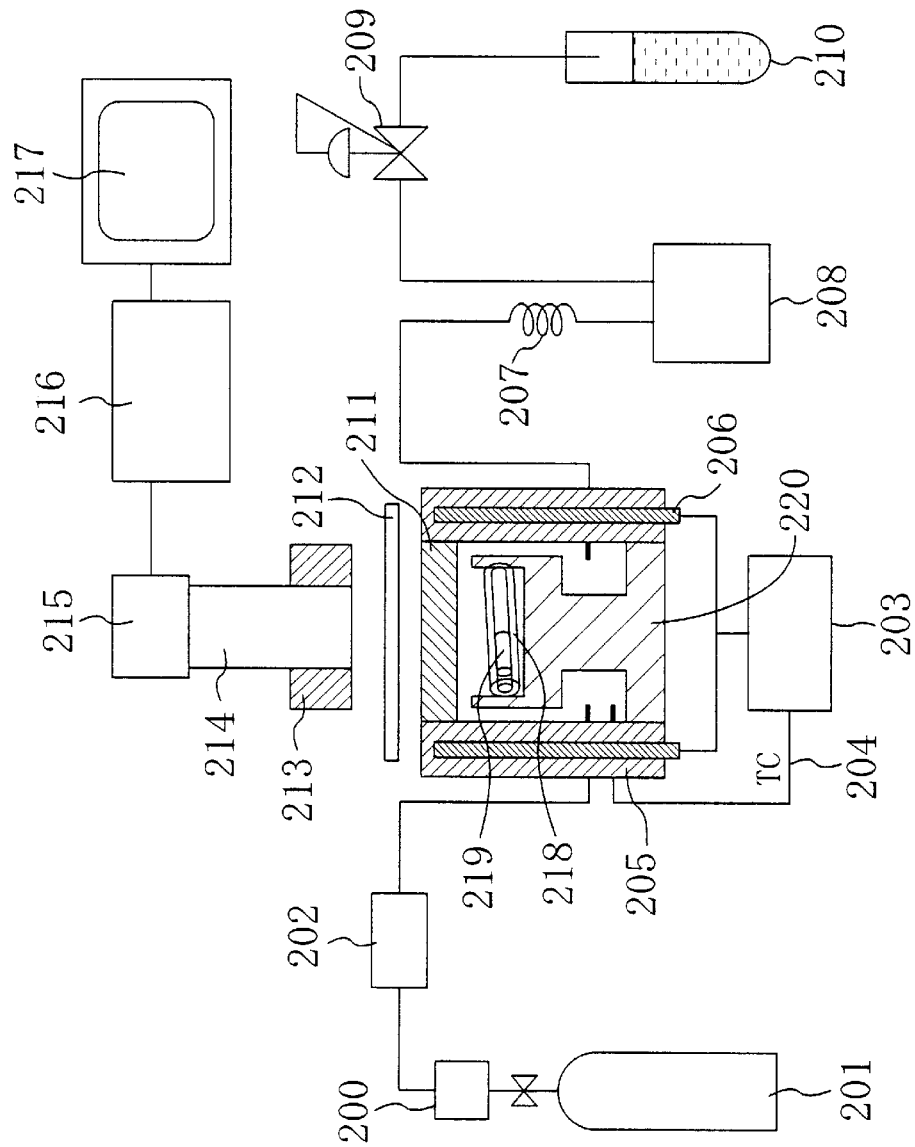
FIG. 13 is a diagram (partially cross-sectional) illustrating a structure of an apparatus for quantitatively evaluating a volumetric expansion of a plasticizer, etc.

FIG. 13 is a diagram (partially cross-sectional) illustrating a structure of an apparatus for quantitatively evaluating a volumetric expansion of a substance, particularly, a plasticizer, or the like. As illustrated in the figure, the apparatus includes: a pressure chamber 205 for turning a medium (carbon dioxide in the present embodiment), which is selected and used according an object to be achieved, into a supercritical or subcritical state; a cylinder 201 for supplying the medium to be turned into a supercritical or subcritical state; a cooler 200 for cooling the medium flowing out of the cylinder 201; a fluid pump 202 (a liquid pump in the present embodiment) for forcibly feeding the medium (a liquid medium in the present embodiment) into the pressure chamber 205; a temperature control device 203 for controlling the temperature of the medium in the pressure chamber 205; a cooling coil 207 for cooling the medium flowing out of the pressure chamber 205; an ultraviolet spectrometer 208 for performing an ultraviolet spectrometry of the medium flowing out of the pressure chamber 205; a relief valve 209 for controlling the pressure of the medium flowing out of the pressure chamber 205 to a predetermined value; and a extraction/collection container 210 for collecting the medium flowing out of the pressure chamber 205.

The pressure chamber 205 is provided with a heater 206 for heating the pressure chamber 205, and a thermocouple 204 for measuring the temperature of the pressure chamber 205. The temperature of the pressure chamber 205 is controlled by controlling the amount of electric power to be supplied to the heater 206 based on the difference between the temperature indicated by the thermocouple 204 and the predetermined temperature. The medium (a liquid carbon dioxide in the present embodiment) is supplied from the cylinder 201, passes through the cooler 200, and is pumped by the fluid pump 202 into the pressure chamber 205. The medium (carbon dioxide) flowing out of the pressure chamber 205 is cooled by the cooling coil 207, passes through the ultraviolet spectrometer 208, and reaches the relief valve 209. The pressure of the pressure chamber 205 and that of the piping system connected thereto are set to be equal to the predetermined pressure of the relief valve 209. Thus, a high pressure is applied to the area extending from the fluid pump 202 via the pressure chamber 205 to the relief valve 209. A liquid component or a solid component in the medium discharged from the relief valve 209 is collected in the extraction/collection container 210.

The apparatus of the present embodiment is provided with the following members in order to quantitatively measure the volumetric expansion of a plasticizer, or the like.

A sapphire window 211 is provided in the ceiling of the pressure chamber 205 so that the inside of the pressure chamber 205 can be observed from the outside. Moreover, provided above the ceiling of the pressure chamber 205 are: a light 213 for illuminating the inside of the pressure chamber 205; a CCD 215 for imaging the inside of the pressure chamber 205; a lens 214 for focusing the light reflected from the inside of the pressure chamber 205 onto the CCD 215; a video recording device 216 for continuously recording the moving image taken by the CCD 215; and a monitor 217 for observing the image taken by the CCD 215. A heat absorbing glass 212 for protecting the lens 214 is provided between the sapphire window 211 and the lens 214. The image taken by the CCD 215 can be recorded by the video recording device 216 while being observed through the monitor 217.

A transparent glass tube 218 having an inner diameter less than or equal to a critical diameter for causing a capillary effect on a plasticizer, or the like (about 1 mm in the present embodiment), and a supporting member 220 for the glass tube 218 are provided in the pressure chamber 205. When carrying out the method for quantitatively measuring the concentration of a plasticizer, or the like, of the present invention, a plasticizer 219 is introduced into the transparent glass tube 218 so that the transparent glass tube 218 is partially filled with the plasticizer 219. Then, the volumetric change of the plasticizer 219 is evaluated under various temperature and pressure conditions while maintaining the medium in the pressure chamber 205 (carbon dioxide in the present embodiment) to be in the range between the normal state and the supercritical state, thereby quantitatively evaluating the volumetric expansion of the plasticizer, or the like. While certain types of materials of a plasticizer, or the like, cannot be detected by the ultraviolet spectrometer 208, it is possible to evaluate the dissolving rate of an object in a medium, irrespective of the type of the material of the object, such as a plasticizer, or the like, by employing the method of measuring the volumetric change of the plasticizer, or the like.

The transparent glass tube 218 and the supporting member 220 therefor may not be provided. In such a case, the inside of the pressure chamber 205 can still be observed. Therefore, it is possible to accurately grasp the behavior of the object in a supercritical or subcritical fluid, thereby obtaining important indices for determining the manufacturing process conditions. Moreover, the evaluation apparatus can be used in the manufacturing process, in which case it is possible to perform a process using a supercritical or subcritical fluid while observing the inside of the apparatus in situ.

Figure 14:
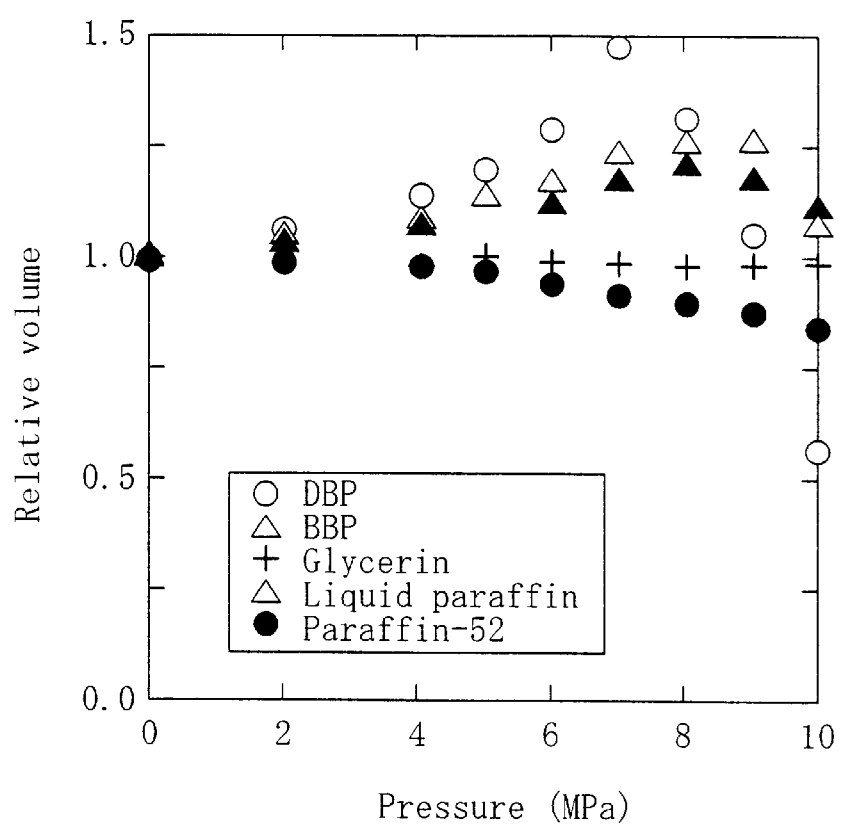
FIG. 14 is a graph illustrating the results of evaluating various plasticizers for the pressure dependency of the volume thereof.

FIG. 14 is a graph illustrating the results of evaluating various plasticizers for the pressure dependency of the volume thereof. In the figure, the horizontal axis represents an additional pressure (MPa) to the atmospheric pressure, and the vertical axis represents the relative volume of each measurement object, the volume of the object with no additional pressure thereon being 1. The relative volume of each plasticizer was measured 10 minutes after when the pressure reached the test pressure value while maintaining the temperature in the pressure chamber 205 at a constant value (40° C.). The relative volume of each plasticizer was measured at various test pressures while increasing the test pressure value from 0 MPa to 4 MPa by 2 MPa, and from 4 MPa to 10 MPa by 1 MPa.

FIG. 14 shows the following. The volume of DBP (dibutyl phthalate) increases as the pressure increases. At a pressure around 7 MPa, the volume of DBP is about 1.5 times as much as that under the normal pressure, and then rapidly decreases as the pressure increases. It is believed that the volume of DBP keeps increasing from the normal pressure to a pressure around 7 MPa because carbon dioxide dissolves in DBP. Therefore, if a green laminate is to be manufactured under the same conditions as those of this experiment, the manufacturing process needs to be designed so that structural defects will not occur even if the volume of DBP expands by about 1.5 fold. The rapid decrease in the relative volume of DBP past 7 MPa is because of the dissolution of DBP in carbon dioxide occurring slightly after the dissolution of carbon dioxide in DBP. The amount of DBP dissolved in carbon dioxide significantly depends on time. On the other hand, a supercritical or subcritical carbon dioxide dissolves in DBP quite rapidly, and thus it is believed that the amount of carbon dioxide dissolved DBP is not very much dependent on time. The value along the vertical axis of FIG. 14 represents an amount that is dependent on the difference between the amount of carbon dioxide dissolved in DBP and the amount of DBP dissolved, and thus it may somewhat vary depending on the experiment conditions. However, with the method for measuring the volumetric expansion described above, it is possible to conveniently evaluate the solubility of a medium in a substance such as a plasticizer. The present embodiment will be further described below with continued reference to the results shown in FIG. 14.

When BBP (butyl benzyl phthalate) is used, the volumetric expansion factor is slightly smaller than when DBP is used, but the pressure dependency of the relative volume thereof is similar to that of DBP. Specifically, the relative volume of BBP increases until the additional pressure reaches 8 MPa, and starts decreasing thereafter.

The relative volume of glycerin undergoes little change. This indicates that neither dissolution of glycerin in carbon dioxide nor dissolution of carbon dioxide in glycerin occurs, that is, it is difficult to dissolve glycerin using carbon dioxide alone.

The pressure dependency of the relative volume of a liquid paraffin is similar to that of a phthalate ester such as DBP or BBP.

The relative volume of paraffin-52 (a paraffin that melts into a liquid state at a temperature of 52° C. or more), which has a greater molecular weight than that of a liquid paraffin does not increase even if the pressure increases, but it only decreases. It is believed that this is because paraffin-52 is a solid at the experiment temperature of 40° C., whereby it is difficult for carbon dioxide to dissolve in paraffin-52, and only the dissolution of paraffin-52 in carbon dioxide proceeds.

The evaluation method described above can be used not only for a single plasticizer, but also for a mixture of at least two plasticizers. Moreover, the evaluation method described above can be widely used for a mixture containing a substance in addition to a plasticizer wherein the volumetric change of the substance under high-temperature, high-pressure conditions is to be evaluated.

In view of the above experiment results taken as a whole, the following specific methods can be preferably used for removing a particular substance such as a plasticizer from a mixture.

First Specific Method

Where paraffin-52 is used as a plasticizer with a medium (e.g., carbon dioxide) in a supercritical or near-supercritical state, paraffin-52 is heated so that it is present in the form of a liquid during the step of forming a green sheet (step ST3 shown in FIG. 10) during which the plasticizer needs to have a fluidity, and a temperature such that paraffin-52 is present in the form of a solid is maintained during the de-plasticizer step (step ST5 shown in FIG. 10). In this way, it is possible to suppress the occurrence of structural defects in a green laminate (compact) due to a volumetric expansion of the plasticizer, and thus the occurrence of structural defects in a ceramic laminate (sinter).

Second Specific Method

As already described above, in a case where the de-plasticizer step of the first embodiment is performed while using a phthalate ester such as dibutyl phthalate or butyl benzyl phthalate as a plasticizer, structural defects may occur in the green laminate. In such a case, a heating de-plasticizer process under a normal pressure and at a temperature of about 200° C. to about 250° C. may be performed between step ST4 and step ST5 shown in FIG. 10, followed by a de-plasticizer step as described above in the first embodiment, whereby it is possible to realize a substantially complete de-plasticizer process without causing structural defects. For example, when the de-plasticizer step of the first embodiment was performed following a heating de-plasticizer process in nitrogen at 220° C. for three hours, structural defects did not occur, and the mass further decreased after the heating de-plasticizer process, indicating that the plasticizer was completely extracted/removed in terms of mass calculation.

It is believed that structural defects do not occur in the green laminate with this procedure because a large number of minute gaps (micro open pores) that are connected to the outside are produced in the green laminate during the heating de-plasticizer process, the minute gaps serving as a space that buffers the volumetric expansion of the plasticizer. It is believed that the further decrease in mass following the de-plasticizer step of the first embodiment after the heating de-plasticizer process is because of the low viscosity of a supercritical carbon dioxide and its high capability of dissolving the plasticizer, thereby allowing for efficient extraction of the plasticizer remaining in the green laminate. Thus, it is effective to combine the heating de-plasticizer process with the de-plasticizer step of the first embodiment in cases where a plasticizer that undergoes volumetric expansion needs to be used under particular conditions.

Third Specific Method

Another effective method is fluid substitution. The method will now be described with respect to an example where the de-plasticizer step of the first embodiment (step ST5 shown in FIG. 10) is performed while using, for example, BBP (butyl benzyl phthalate). According to the first embodiment, after the temperature of the pressure chamber 121 is set to 40° C., the carbon dioxide 122 in a liquid state is gradually introduced through the introduction port 123, after which the carbon dioxide is pressurized in the pressure chamber 121 of FIG. 2 to 10 MPa. In this process, BBP undergoes a volumetric expansion of about 25% due to the dissolution of carbon dioxide in BBP while the pressure is increased from the normal pressure to about 8 MPa, whereby structural defects may occur in the green laminate. In view of this, the pressure chamber 121 may be first filled with a substance other than carbon dioxide, e.g., nitrogen, that has little or no capability of dissolving BBP, followed by pressurization of nitrogen, etc., in the pressure chamber 205 to 10 MPa, for example, after which nitrogen is gradually substituted by carbon dioxide while maintaining the pressure at 10 MPa. In this way, it is possible to extract/remove BBP from the green laminate without causing a volumetric expansion of BBP due to carbon dioxide. While nitrogen is used in the example above, any other substance may alternatively be used as long as it has little or no capability of dissolving the plasticizer.

Other than nitrogen, an inert gas such as argon or helium may be used as a pressurization medium.

Fourth Specific Method

Still another method is to rapidly increase the pressure in the pressure chamber 205. In the description of the first embodiment above, it is stated that the pressure is preferably increased at a pressure changing rate of 10 MPa/hour or less in the de-plasticizer step so as to suppress the occurrence of structural defects in the green laminate 100 (compact), and thus the occurrence of structural defects in a ceramic laminate (sinter). However, when a plasticizer that undergoes a significant volumetric expansion is used, it is in some cases preferred to increase the pressure rapidly. For example, with BBP used as the plasticizer, there was a smaller amount of structural defects when the pressure was increased rapidly at a rate of 1 MPa/min or more from the normal pressure to about 8 MPa. It is believed that this is because the high pressure condition is reached while the dissolution of carbon dioxide in BBP is insufficient, thereby resulting in a reduced volumetric expansion of BBP.

When only an organic substance is removed from a mixture in a process of manufacturing a sinter including a step of sintering a mixture of an organic substance and an inorganic substance in general, including but not limited to a plasticizer, the organic substance removing process using a supercritical or subcritical fluid of the third embodiment above can be performed. Where there are a plurality of types of organic substances, the various specific methods of the present embodiment can be used so as to remove only one or some of the plurality of types of organic substances or to remove all of the plurality of types of organic substances.

Alternative Embodiment

In the first, second and third embodiments above, the present invention has been described with respect to a method for extracting/removing only a plasticizer from a green laminate, which is a mixture of a dielectric material, a binder, a plasticizer and a metal powder. Alternatively, the present invention can be used for other applications in addition to these embodiments. The present invention will now be described with respect to a solid tantalum electrolytic capacitor.

Figure 15:
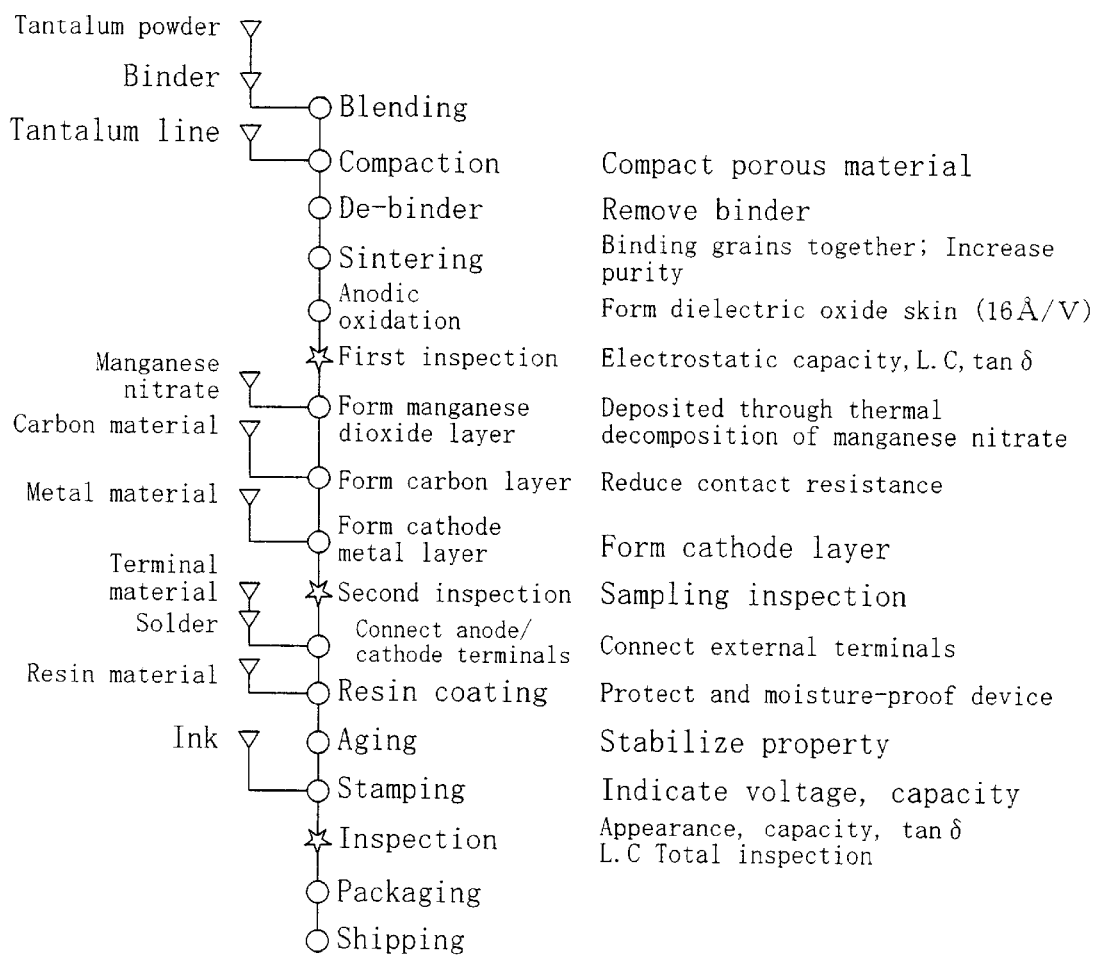
FIG. 15 generally shows the process of manufacturing a solid tantalum electrolytic capacitor according to an alternative embodiment of the present invention.
Figure 16:
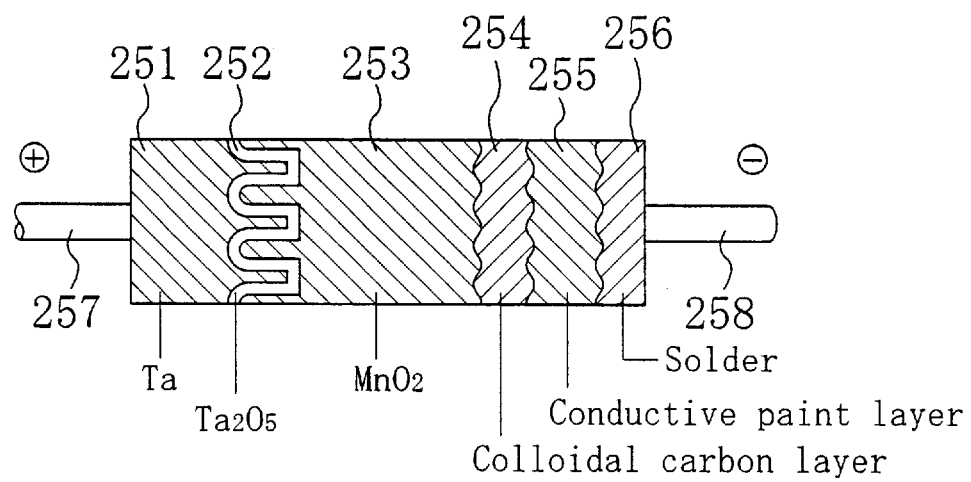
FIG. 16 is a cross-sectional view illustrating a structure of a solid tantalum electrolytic capacitor produced by the process illustrated in FIG. 15.

FIG. 15 generally shows the process of manufacturing a solid tantalum electrolytic capacitor. FIG. 16 is a cross-sectional view illustrating a structure of a solid tantalum electrolytic capacitor produced by the process illustrated in FIG. 15 (excerpted from "Kondensa Saishin Gijutsu To Zairyou (Latest Techniques And Materials For Capacitors) '86 Edition (Sogogijutsu Shuppan) published in October 1985").

As illustrated in FIG. 15 and FIG. 16, a high-purity, fine tantalum metal powder is mixed with an organic binder such as camphor or naphthalene being dissolved in an organic solvent. Then, a lead wire is buried in the mixture, and the mixture is compacted with a pressure into a predetermined shape so as to obtain a porous material. Then, a de-binder process is performed in a vacuum, or the like, to remove the organic binder such as camphor or naphthalene, after which a sintering step is performed in a high-degree vacuum of about $10^{-3}$ Pa to about $10^{-4}$ Pa and at a high temperature of 1500 to 2000° C. so as to bind tantalum grains to each other and to the lead wire, thereby obtaining a porous sinter 251. Then, the porous sinter 251 is subjected to an electrochemical anodic oxidation process in an electrolytic solution such as a phosphoric acid so as to form a dielectric oxide skin 252 (Ta oxide) on the porous sinter 251. Then, after a first inspection, a manganese dioxide layer 253 is formed on the dielectric oxide skin 252 through thermal decomposition of manganese nitrate, after which a colloidal carbon layer 254 for reducing a contact resistance is formed on the manganese dioxide layer 253. Then, a conductive paint layer 255 to be a cathode metal layer such as a silver paint layer is formed on the colloidal carbon layer 254, followed by a second inspection. Then, external terminals 257 and 258 are connected to the lead and the conductive paint layer 255, respectively. Finally, the surface of the capacitor is coated with a resin, and an aging step and a finishing step are performed to complete the capacitor.

In the manufacturing process described above, if the de-binder step is incomplete, the dielectric oxide skin 252 (Ta oxide) cannot be formed with a uniform thickness, resulting in a defect in the product. Therefore, also in such a solid tantalum electrolytic capacitor, it is important to completely remove an organic binder. Therefore, the first inspection is performed after the formation of the dielectric oxide skin 252, as illustrated in FIG. 15.

The methods of the first and second embodiments and the various specific methods of the third embodiment can be applied to the de-binder step in the process of manufacturing a solid tantalum electrolytic capacitor, in which case it is possible to substantially completely remove an organic binder. In such a case, only an organic binder is selectively extracted/removed from a mixture of a tantalum metal powder and an organic binder, instead of selectively extracting/removing only a plasticizer from a green laminate, which is a mixture of a dielectric material, a binder, a plasticizer and a metal powder, as described above. Therefore, a mixture of a tantalum metal powder and an organic binder such as camphor or naphthalene is placed in a pressure chamber, and is contacted with carbon dioxide in a supercritical or subcritical (near-supercritical) state according to any of the methods of the various embodiments (including the various specific methods), whereby it is possible to selectively extract/remove only the organic binder in a short period of time. Moreover, the extracted/removed organic binder such as camphor or naphthalene can be collected and reused, thereby improving the manufacturing efficiency and the product quality.

What is claimed is:

1. A method for manufacturing a sinter, comprising the steps of:
   (a) layering an internal electrode layer containing at least a conductive material powder and a dielectric layer containing a ceramic material powder, a binder and a plasticizer on each other, so as to produce a green laminate;
   (b) contacting the green laminate with a supercritical or subcritical fluid so as to extract/remove the plasticizer in the green laminate;
   (c) after the step (b), decomposing and removing the binder in the green laminate; and
   (d) after the step (c), sintering the green laminate.

2. The method for manufacturing a sinter of claim 1, wherein in the step (a), at least one resin selected from a butyral resin, an acrylic resin, a polypropylene and a polyethylene is used as the binder.

3. The method for manufacturing a sinter of claim 1, wherein in the step (a), at least one substance selected from an ester, stearic acid, stearyl alcohol and a paraffin is used as the plasticizer.

4. The method for manufacturing a sinter of claim 3, wherein in the step (a), a phthalate ester is used as the plasticizer.

5. The method for manufacturing a sinter of claim 1, wherein in the step (a), a paraffin that is present in a form of a solid during the step (b) is used as the plasticizer.

6. The method for manufacturing a sinter of claim 1, wherein in the step (b), at least one substance selected from carbon dioxide, a hydrocarbon and a polyhalogenated hydrocarbon is used as the supercritical or subcritical fluid.

7. The method for manufacturing a sinter of claim 6, wherein in the step (b), carbon dioxide is used as the supercritical or subcritical fluid, and the temperature of carbon dioxide is maintained in a range from room temperature to 50° C., or in a range from 140° C. to a temperature used in the step (c).

8. The method for manufacturing a sinter of claim 1, wherein in the step (b), at least one substance selected from an alcohol, a ketone and a hydrocarbon is mixed in the supercritical or subcritical fluid as an entrainer (extraction assistant).

9. The method for manufacturing a sinter of claim 1, wherein in the step (b), a pressure of the fluid containing the plasticizer that has been extracted/removed from the green laminate is reduced so as to turn the fluid into a gaseous state, thereby separating the fluid and the plasticizer from each other to collect the plasticizer.

10. The method for manufacturing a sinter of claim 1, wherein in the step (a), at least one metal selected from Pt, Pd and Ni is used as the conductive material powder.

11. The method for manufacturing a sinter of claim 1, wherein in the step (b), a pressure of the supercritical or subcritical fluid is changed with time.

12. The method for manufacturing a sinter of claim 1, wherein in the step (b), an ultrasonic vibration is applied to the fluid.

13. The method for manufacturing a sinter of claim 1, further comprising the step of subjecting the green laminate to a heat treatment at 250° C. or more in a vacuum or a gas, between the step (a) and the step (b).

14. The method for manufacturing a sinter of claim 1, wherein in the step (b), the green laminate is pressurized by using a pressurization medium, and then the pressurization medium is substituted by the supercritical or subcritical fluid.

15. The method for manufacturing a sinter of claim 14, wherein an inert gas is used as the pressurization medium, and at least one substance selected from carbon dioxide, a hydrocarbon and a polyhalogenated hydrocarbon is used as the supercritical or subcritical fluid.

16. The method for manufacturing a sinter of claim 1, wherein in the step (b), the fluid is turned into a supercritical or subcritical state by rapidly pressurizing the fluid at a rate of 1 MPa/min or more.

17. The method for manufacturing a sinter of claim 1, further comprising the step of evaluating a concentration distribution of the plasticizer in the green laminate by using a microscopic laser Raman spectroscopy method, at any point after the step (b) and before the step (d).

18. The method for manufacturing a sinter of claim 17, wherein a relative concentration distribution is obtained by calculating a relative intensity by normalizing an intensity of a plasticizer-induced absorption band peak of the Raman spectrum with respect to an intensity of a ceramic-induced absorption band peak.

* * * * *